US012346976B2

(12) United States Patent
Call et al.

(10) Patent No.: US 12,346,976 B2
(45) Date of Patent: *Jul. 1, 2025

(54) FAULT DETERMINATION OF BLOCKCHAIN SUBROGATION CLAIMS

(71) Applicant: STATE FARM MUTUAL AUTOMOBILE INSURANCE COMPANY, Bloomington, IL (US)

(72) Inventors: Shawn M. Call, Bloomington, IL (US); Jaime Skaggs, Chenoa, IL (US); Eric Bellas, Bloomington, IL (US); Douglas A. Graff, Mountain View, MO (US); William J. Leise, Normal, IL (US); Vicki King, Bloomington, IL (US); Jacob J. Alt, Downs, IL (US); Eric R. Moore, Heyworth, IL (US); Stacie A. Mccullough, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,151

(22) Filed: Nov. 28, 2023

(65) Prior Publication Data
US 2024/0095846 A1    Mar. 21, 2024

Related U.S. Application Data

(63) Continuation of application No. 17/963,293, filed on Oct. 11, 2022, now Pat. No. 11,861,729, which is a
(Continued)

(51) Int. Cl.
G06Q 40/08    (2012.01)
G06Q 20/06    (2012.01)
H04L 9/00     (2022.01)

(52) U.S. Cl.
CPC ......... *G06Q 40/08* (2013.01); *G06Q 20/0655* (2013.01); *G06Q 2220/00* (2013.01); *H04L 9/50* (2022.05)

(58) Field of Classification Search
CPC ........ G06Q 40/08; G06Q 40/02; G06Q 10/10; G06Q 20/02; G06Q 50/22; G06Q 20/10;
(Continued)

(56) References Cited

U.S. PATENT DOCUMENTS 7,739,133 B1    6/2010    Hail et al.
7,962,385 B2    6/2011    Falk et al.
(Continued)

FOREIGN PATENT DOCUMENTS

AU    2009212995        3/2010
AU    2009212995 A1     3/2010
(Continued)

OTHER PUBLICATIONS

"Blockchain", Wikpedia, (2019).
(Continued)

Primary Examiner — Hani M Kazimi
Assistant Examiner — Sanjeev Malhotra
(74) Attorney, Agent, or Firm — MARSHALL, GERSTEIN & BORUN LLP; Randall G. Rueth

(57) ABSTRACT

A shared ledger operated by a group of network participants according to a set of consensus rules manages and resolves subrogation claims between a clamant and a defendant with arbitration. Evidence regarding the value of the subrogation claim is sent to the shared ledger by the parties to the subrogation claim such as sending data to a smart contract deployed on the shared ledger. The parties to the subrogation claim or entities that are not parties to the subrogation claim may broadcast data relating to fault to the blockchain. The data relating to fault may be evaluated by the parties or
(Continued)

entities acting on the parties' behalf to determine fault. A fault determination may be broadcast to the blockchain based upon the analysis of the data relating to fault. Once the claim is resolved, arbitrator may release funds on the chain to the prevailing party or may accept confirmation that any payments have been made between the parties off-chain.

20 Claims, 12 Drawing Sheets

Related U.S. Application Data continuation of application No. 17/168,024, filed on Feb. 4, 2021, now Pat. No. 11,501,383, which is a continuation of application No. 15/955,213, filed on Apr. 17, 2018, now Pat. No. 10,949,926.

(60) Provisional application No. 62/584,364, filed on Nov. 10, 2017, provisional application No. 62/584,424, filed on Nov. 10, 2017, provisional application No. 62/584,435, filed on Nov. 10, 2017, provisional application No. 62/555,174, filed on Sep. 7, 2017, provisional application No. 62/555,177, filed on Sep. 7, 2017, provisional application No. 62/555,014, filed on Sep. 6, 2017, provisional application No. 62/555,002, filed on Sep. 6, 2017, provisional application No. 62/510,664, filed on May 24, 2017.

(58) Field of Classification Search
CPC .. G06Q 20/102; G06Q 20/3223; G06Q 20/40; G06Q 20/401; G06Q 20/4014; G06Q 20/405; G06Q 10/087; G06Q 10/20; G06Q 20/32; G06Q 20/322; G06Q 20/3227; G06Q 20/327; G06Q 20/3276; G06Q 20/367; G06Q 20/3674; G06Q 20/382; G06Q 20/3829; G06Q 2220/00; G06Q 40/12; G06Q 50/18; G06F 19/328; G06F 1/163; G06F 3/00; G06F 3/017; B33Y 10/00; G01L 5/0052; G06K 9/00342; G06K 9/18; G06K 9/22; H04W 84/18; H04W 88/02; H04L 667/10; H04N 5/2253; H04Q 2209/40; H04Q 9/00
USPC .............. 705/2, 3, 4, 35, 38, 40, 41, 75, 80; 257/21.33; 434/247
See application file for complete search history.

(56) References Cited

U.S. PATENT DOCUMENTS

| | | | | |
|---|---|---|---|---|
| 8,706,586 | B2* | 4/2014 | Rojewski | G06Q 40/08 705/38 |
| 8,799,034 | B1* | 8/2014 | Brandmaier | G07C 5/008 705/4 |
| 9,508,200 | B1* | 11/2016 | Mullen | G06Q 10/20 |
| 10,454,878 | B2 | 10/2019 | Khan et al. | |
| 10,521,780 | B1 | 12/2019 | Hopkins, III et al. | |
| 10,586,062 | B1 | 3/2020 | Rangan et al. | |
| 10,606,669 | B2 | 3/2020 | Jacobs et al. | |
| 10,796,393 | B2 | 10/2020 | Messerges et al. | |
| 10,805,085 | B1 | 10/2020 | Liang | |
| 10,812,255 | B2 | 10/2020 | Li | |
| 10,824,759 | B1 | 11/2020 | Magerkurth et al. | |
| 10,833,843 | B1 | 11/2020 | Vijayvergia et al. | |
| 10,872,381 | B1 | 12/2020 | Leise et al. | |
| 10,878,512 | B1 | 12/2020 | Al-Zoubi et al. | |
| 10,891,694 | B1 | 1/2021 | Leise et al. | |
| 10,949,926 | B1 | 3/2021 | Call et al. | |
| 10,963,966 | B1 | 3/2021 | Brandmaier et al. | |
| 11,100,477 | B1 | 8/2021 | Kemper et al. | |
| 11,270,383 | B1 | 3/2022 | Call et al. | |
| 2003/0028404 | A1* | 2/2003 | Herron | G06Q 40/08 705/4 |
| 2005/0086180 | A1* | 4/2005 | Wamsley | G06Q 40/08 705/80 |
| 2006/0089895 | A1* | 4/2006 | Joye | G06Q 40/00 705/35 |
| 2006/0116914 | A1* | 6/2006 | Stemple | G06Q 30/02 705/4 |
| 2007/0185743 | A1* | 8/2007 | Jinks | G06Q 40/08 705/4 |
| 2008/0071664 | A1 | 3/2008 | Silverman et al. | |
| 2008/0235064 | A1* | 9/2008 | Gulko | H01L 21/28035 257/E21.133 |
| 2008/0243556 | A1* | 10/2008 | Hogan | G06Q 10/10 705/4 |
| 2011/0178906 | A1* | 7/2011 | Joye | G06Q 40/00 705/35 |
| 2011/0320226 | A1* | 12/2011 | Graziano | G06Q 40/08 705/4 |
| 2012/0136780 | A1* | 5/2012 | El-Awady | G06Q 20/102 705/40 |
| 2012/0239417 | A1* | 9/2012 | Pourfallah | G06Q 30/0601 705/2 |
| 2013/0304517 | A1 | 11/2013 | Florence | |
| 2014/0108057 | A1* | 4/2014 | Daniels | G06Q 40/08 705/4 |
| 2014/0229206 | A1* | 8/2014 | Rojewski | G06Q 40/06 705/4 |
| 2014/0379361 | A1* | 12/2014 | Mahadkar | G06Q 40/08 705/2 |
| 2015/0046188 | A1* | 2/2015 | De La Garza | G06Q 10/10 705/3 |
| 2016/0125386 | A1* | 5/2016 | Desai | G06Q 30/0641 705/41 |
| 2016/0217258 | A1* | 7/2016 | Pitroda | G06Q 20/02 |
| 2016/0253663 | A1* | 9/2016 | Clark | G06Q 20/341 705/75 |
| 2016/0292672 | A1* | 10/2016 | Fay | G06Q 20/06 |
| 2017/0161827 | A1* | 6/2017 | Imrey | G06Q 40/00 |
| 2017/0186057 | A1 | 6/2017 | Metnick | |
| 2017/0232300 | A1* | 8/2017 | Tran | G06F 1/163 434/247 |
| 2017/0243212 | A1 | 8/2017 | Castinado et al. | |
| 2017/0308893 | A1 | 10/2017 | Saraniecki | |
| 2017/0352012 | A1 | 12/2017 | Hearn et al. | |
| 2017/0372432 | A1* | 12/2017 | McKown | G06Q 20/14 |
| 2018/0025334 | A1* | 1/2018 | Pourfallah | G06Q 20/14 705/41 |
| 2018/0025442 | A1 | 1/2018 | Isaacson et al. | |
| 2018/0046992 | A1 | 2/2018 | Hanrahan et al. | |
| 2018/0053257 | A1* | 2/2018 | Nelemans | G06Q 40/08 |
| 2018/0091316 | A1 | 3/2018 | Stradling et al. | |
| 2018/0117447 | A1* | 5/2018 | Tran | G09B 19/0038 |
| 2018/0218343 | A1 | 8/2018 | Kolb et al. | |
| 2018/0218455 | A1 | 8/2018 | Kolb et al. | |
| 2018/0365684 | A1 | 12/2018 | Reilly et al. | |
| 2019/0019186 | A1 | 1/2019 | Falah et al. | |
| 2019/0026821 | A1 | 1/2019 | Bathen et al. | |
| 2019/0080325 | A1* | 3/2019 | Pourfallah | G06Q 20/3276 |
| 2019/0102736 | A1 | 4/2019 | Hudson | |
| 2019/0191284 | A1* | 6/2019 | Tran | A61B 5/6804 |
| 2019/0197620 | A1 | 6/2019 | Jayaram et al. | |
| 2019/0354966 | A1 | 11/2019 | Himura et al. | |
| 2019/0392437 | A1 | 12/2019 | Castagna et al. | |
| 2019/0392438 | A1 | 12/2019 | Rice | |
| 2020/0058071 | A1 | 2/2020 | Yang | |
| 2020/0065763 | A1 | 2/2020 | Rosinzonsky et al. | |
| 2020/0177373 | A1 | 6/2020 | Komandur et al. | |
| 2020/0226677 | A1 | 7/2020 | Dhawan et al. | |
| 2020/0250753 | A1 | 8/2020 | Blount | |
| 2020/0272966 | A1 | 8/2020 | Kirkegaard | |
| 2020/0279328 | A1 | 9/2020 | Zhiri et al. | |
| 2020/0341971 | A1 | 10/2020 | Krishnaswamy et al. | |
| 2020/0394321 | A1 | 12/2020 | Ramos et al. | |
| 2020/0394322 | A1 | 12/2020 | Ramos et al. | |
| 2020/0409937 | A1 | 12/2020 | Wang et al. | |

(56) References Cited

U.S. PATENT DOCUMENTS

| | | | |
|---|---|---|---|
| 2021/0065293 A1 | 3/2021 | Sigler et al. | |
| 2021/0090037 A1 | 3/2021 | Dowding | |
| 2021/0174442 A1 | 6/2021 | Trudeau et al. | |

FOREIGN PATENT DOCUMENTS

| | | |
|---|---|---|
| WO | 2004044696 | 5/2004 |
| WO | WO-2004044696 A2 | 5/2004 |
| WO | 2018232493 | 12/2018 |
| WO | WO-2018232493 A1 | 12/2018 |
| WO | 2021/046494 | 3/2021 |
| WO | WO-2021/046494 A1 | 3/2021 |

OTHER PUBLICATIONS

"Managing Terrorism Financing Risk in Remittances and Money Transfers", Testimony by John Cassara on Jul. 18, 2017, 17 pages.
"The Blockchain Imperative: The Next Challenge for P&C Carriers" published in Cognizant, Nov. 2016, 20 pages.
"The Blockchain Imperative: The Next Challenge for P&C Carriers", published in Cognizant, Nov. 2016.
"The Hawala Alternative Remittance System and Its Role in Money Laundering", by Jost and Sandhu, published in Jan. 2000, 27 pages.
Aru, "HashCoin uses Emercoin Blockchain for Vehicle Registration," Dec. 8, 2016, <https://cointelegraph.com/news/hashcoin-uses-emercoin-blockchain-for-vehicle-registration-and-tracking>.
Chichester, Wide Open Spaces: How Blockchains Have Moved Beyond Currency, The Computer & Internet Lawyer (Aug. 2017).
Dizman, Beyond cryptocurrency: the role of blockchain in the future. ERP and Blockchain Integration, Thesis, Centria University of Applied Sciences, Bachelor of Business Administration, Business Management (Sep. 2021).
Hassan et al., Secured Insurance Framework Using Blockchain and Smart Contract, Scientific Programming, vol. 2021, Article ID 6787406, 11 pages (2021).
PWC, "Blockchain in the Insurance Sector," Dec. 22, 2016, <https://www.the-digital-insurer.com/wp-content/uploads/2016/12/795-blockchain-in-insurance.pdf>.
Report of the US Secretary of Tresury to US Congress, Nov. 2002, 47 pages.
Report to US Congess submitted by US Tresury Secretray, Board of Governors of the Federal Reserve System, and the Securities and Exchange Commission, on Dec. 31, 2002, 40 pages.
Semenovich, Blockchain, smart contracts and their potential insurance applications, Actuaries Institute, General Insurance Seminar, 2016.
Thompson, "Misplaced Blame: Islam, Terrorism and the Origins of Hawala", published in 2007, Max Planck UN Year Book vol. 11, 28 pages.
U.S. Appl. No. 15/955,180, Call et al., "Blockchain Subrogation Claims With Arbitration", filed Apr. 17, 2018.
U.S. Appl. No. 15/955,180, Final Office Action, dated May 21, 2020.
U.S. Appl. No. 15/955,180, Final Office Action, dated Sep. 22, 2021.
U.S. Appl. No. 15/955,180, Nonfinal Office Action, dated Jan. 30, 2020.
U.S. Appl. No. 15/955,180, Nonfinal Office Action, mailed Feb. 10, 2021.
U.S. Appl. No. 15/955,180, Notice of Allowance, dated Dec. 27, 2021.
U.S. Appl. No. 15/955,213, Call et al., "Fault Determination of Blockchain Subrogation Claims", filed Apr. 17, 2018.
U.S. Appl. No. 15/955,213, Final Office Action, dated Jun. 1, 2020.
U.S. Appl. No. 15/955,213, Nonfinal Office Action, dated Nov. 25, 2019.
U.S. Appl. No. 15/955,213, Nonfinal Office Action, dated Oct. 14, 2020.
U.S. Appl. No. 15/955,213, Notice of Allowance, dated Jan. 8, 2021.
U.S. Appl. No. 15/972,980, Final Office Action, dated Aug. 19, 2020.
U.S. Appl. No. 15/972,980, Final Office Action, dated Jul. 13, 2022.
U.S. Appl. No. 15/972,980, Nonfinal Office Action, dated Feb. 3, 2022.
U.S. Appl. No. 15/972,980, Nonfinal Office Action, dated Mar. 2, 2020.
U.S. Appl. No. 15/972,980, Skaggs et al., "Blockchain Subrogation Payments", filed May 7, 2018.
U.S. Appl. No. 17/168,024, Nonfinal Office Action, dated May 9, 2022.
U.S. Appl. No. 17/168,024, Notice of Allowance, dated Aug. 19, 2022.
U.S. Appl. No. 17/238,546, Final Office Action, dated Mar. 23, 2022.
U.S. Appl. No. 17/238,546, Nonfinal Office Action, dated Nov. 19, 2021.
U.S. Appl. No. 17/583,497, Nonfinal Office Action, dated Sep. 9, 2022.
Yuan et al., Toward biochain based intelligent transportation systems, 2016 IEEE Conference, Nov. 2016.
U.S. Appl. No. 17/583,497, NonFinal Office Action, dated Feb. 9, 2023.
Office Action for U.S. Appl. No. 17/238,546 dated Mar. 23, 2022.
Office Action for U.S. Appl. No. 17/238,546 dated Nov. 19, 2021.
U.S. Appl. No. 17/963,293, NonFinal Office Action, dated May 11, 2023.
U.S. Appl. No. 17/168,024, Nonfinal Action, dated May 9, 2022.
U.S. Appl. No. 17/238,546, Final Action, dated Mar. 23, 2022.
U.S. Appl. No. 17/238,546, Nonfinal Action, dated Nov. 19, 2021.
U.S. Appl. No. 17/583,497, Nonfinal Action, dated Sep. 9, 2022.

\* cited by examiner

| |
|---|
| IDs: unique ID for the subrogation claim, subrogation plaintiff claim number, and/or subrogation defendant claim number. |
| Subrogation Claimant: the identity of the party seeking a subrogation payment. |
| Subrogation Defendant: the party against whom the subrogation claim has been made. |
| Policy Holder: assignor of claim against Subrogation Claimant. |
| Damages: general description of alleged damages suffered. |
| Damages evidence 1: data regarding value of subrogation claim (e.g., vehicle repair) |
| Damages evidence 1: data regarding value of subrogation claim (e.g., medical bill) |
| Damages evidence 1: data regarding value of subrogation claim (e.g., temporary transportation for policy holder) |

| Smart Contract Data: | Claimant | Defendant | |
|---|---|---|---|
| Damages 1 Accepted | ■ | ☐ | Arbitration Agreed ■ |
| Damages 2 Accepted | ■ | ☐ | Mr. Marshall Solomon, Esq. |
| Damages 3 Accepted | ☐ | ☐ | Settlement Paid ☐ |

506 — SUBROGATION SMART CONTRACT STATE 502
504
... ← BLOCK ← BLOCK ← BLOCK ← BLOCK

FAULT DETERMINATION OF BLOCKCHAIN SUBROGATION CLAIMS

CROSS-REFERENCE TO RELATED APPLICATIONS

The present application is a continuation of U.S. patent application Ser. No. 17/963,293 entitled "Fault Determination of Blockchain Subrogation Claims," filed on Oct. 11, 2022, which is a continuation of U.S. patent application Ser. No. 17/168,024 entitled "Fault Determination of Blockchain Subrogation Claims," filed on Feb. 4, 2021, which is a continuation of U.S. patent application Ser. No. 15/955,213 entitled "Fault Determination of Blockchain Subrogation Claims," filed on Apr. 17, 2018, which claims priority to U.S. Application No. 62/584,364, filed Nov. 10, 2017; U.S. Application No. 62/584,424, filed Nov. 10, 2017; U.S. Application No. 62/584,435, filed Nov. 10, 2017; U.S. Application No. 62/555,002, filed Sep. 6, 2017; U.S. Application No. 62/555,174, filed Sep. 7, 2017; U.S. Application No. 62/555,014, filed Sep. 6, 2017; U.S. Application No. 62/555,177, filed Sep. 7, 2017; U.S. Application No. 62/510,664, filed May 24, 2017, the entire contents of each of which is hereby expressly incorporated herein by reference.

TECHNICAL FIELD

Systems and methods are disclosed with respect to using a blockchain for managing and resolving subrogation payments involving an insured loss with arbitration.

BACKGROUND

When an insured person suffers a covered loss, an insurer may pay costs to the insured person and pursue subrogation from another party involved in the loss. For example, if an insured vehicle is involved in a collision and suffers a loss, the insurer may compensate the vehicle owner according to an insurance agreement. If, for example, the vehicle owner was not at fault in the collision, the insurer may pursue damages from another party, such as the insurer of the party who was at fault in the collision. An insurance agreement may include an obligation of an insured to assign the insured's claim against a party at fault to the insurer, who may then collect on the claim on the insured's behalf.

Settling a subrogation payment may be a lengthy, complicated process. The various parties (e.g., parties at fault in a vehicle collision, owners of the vehicles, insurers, etc.) may need to exchange information relating to the collision to determine which party was at fault. Sources of information relevant to a fault information and/or subrogation payment include information regarding parties involved in a loss, forensic data regarding the loss, vehicle data regarding a loss, etc. The various parties must verify and share information from a variety of sources including information held by parties involved in a loss and their insurers and information obtained from third parties (e.g., governmental entities, independent contractors, etc.).

The parties to a subrogation payment (e.g., insurers) may make proposals to one another to settle the subrogation claim. A proposal may include an accounting of damages, such as the costs to a vehicle owner whose vehicle was damaged. If an insured person suffered an injury in a collision, the injured person's health care costs may be included in the accounting of damages. One or both of the parties to a subrogation claim may rely on independent third parties to assess costs, such as a repair cost estimate by an authorized automotive repair services provider for damage incurred in a collision. To settle the subrogation claim, the parties must indicate acceptance or approval of damages calculations and a payment amount that is agreed between the parties to settle the claim. Parties may rely on a third-party intermediary to handle subrogation negotiations and resolution (e.g., validate information relating to a loss and facilitating communications between the insurers) at added expense. A large volume of data may need to be analyzed and negotiated on between the parties. It is often difficult to collect all relevant data in a secure environment that is trusted by both parties.

If the parties to the subrogation claim cannot settle the claim themselves, then the dispute may be decided in other ways. For example, the parties may submit the claim to arbitration before an arbitrator. The parties may agree to arbitrate the dispute based upon qualifications of the arbitrator (e.g., membership in a professional arbitration association). An arbitrator may request information from the parties, decide disputes between the parties on issues of damages calculations and damages liability. In some cases, the parties to the subrogation claim may withdraw from arbitration and seek resolution of the subrogation claim in another forum such as in a court of law.

BRIEF SUMMARY

A shared ledger operated by a group of network participants according to a set of consensus rules manages and resolves subrogation claims between a clamant and a defendant with arbitration. Evidence regarding the value of the subrogation claim is sent to the shared ledger by the parties to the subrogation claim such as sending data to a smart contract deployed on the shared ledger. The parties to the subrogation claim or entities that are not parties to the subrogation claim may broadcast data relating to fault to the blockchain. The data relating to fault may be evaluated by the parties or entities acting on the parties' behalf to determine fault. A fault determination may be broadcast to the blockchain based upon the analysis of the data relating to fault. Once the claim is resolved, arbitrator may release funds on the chain to the prevailing party or may accept confirmation that any payments have been made between the parties off-chain.

In one aspect, a computer-implemented method of settling a subrogation claim by a shared ledger may be provided. The method may include, via one or more processors, servers, and/or transceivers: (1) paying a claim to an insured for an insured loss; (2) generating an electronic subrogation claim; (3) deploying the electronic subrogation claim (or a link to, or a hash of the electronic subrogation claim) to a shared ledger, the electronic subrogation claim: (a) identifying a subrogation defendant, (b) including information regarding the insured loss, and/or (c) including a demand to arbitrate the electronic subrogation claim; (4) broadcasting an update to the electronic subrogation claim deployed to the shared ledger; and/or (5) receiving an electronic or other subrogation claim settlement payment upon resolution of the subrogation claim to facilitate settling subrogation claims. The method may include additional, less, or alternate actions, including those discussed elsewhere herein.

In another aspect, a validating network node on a shared ledger network may be provided. The node may include (1) a transceiver configured to exchange shared ledger data with peer network nodes, the shared ledger data including subrogation claim transactions including demands for arbitration; (2) a storage media configured to store a copy of the shared ledger, and/or (3) a transaction validator configured to apply a set of consensus rules to shared ledger data received from the peer network nodes, the transaction validator being further configured to append shared ledger data received from peer nodes to the copy of the shared ledger if the shared ledger data satisfies the consensus rules. The node may include additional, less, or alternate functionality, including that discussed elsewhere herein.

In another aspect, a computer-implemented method of settling a subrogation claim by a shared ledger may be provided. The method may include, via one or more processors, servers, and/or transceivers: (1) monitoring a blockchain for an indication of a subrogation claim, the subrogation claim identifying: (a) a subrogation claimant, (b) including evidence regarding an insured loss, and/or (c) including a demand to arbitrate the subrogation claim; (2) determining whether the evidence regarding the insured loss satisfies an acceptance condition; (3) broadcasting to a blockchain network an indication of acceptance of the evidence regarding the insured loss if the evidence regarding the insured loss satisfies the acceptance condition; and/or (4) remitting a payment to the subrogation claimant in settlement of the subrogation claim. The method may include additional, less, or alternate actions, including those discussed elsewhere herein.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and are instrumentalities shown, wherein:

FIG. 5 depicts an exemplary smart contract state in a shared ledger network for resolving subrogation claims with fault determination, in accordance with one aspect of the present disclosure.

Figure 1:
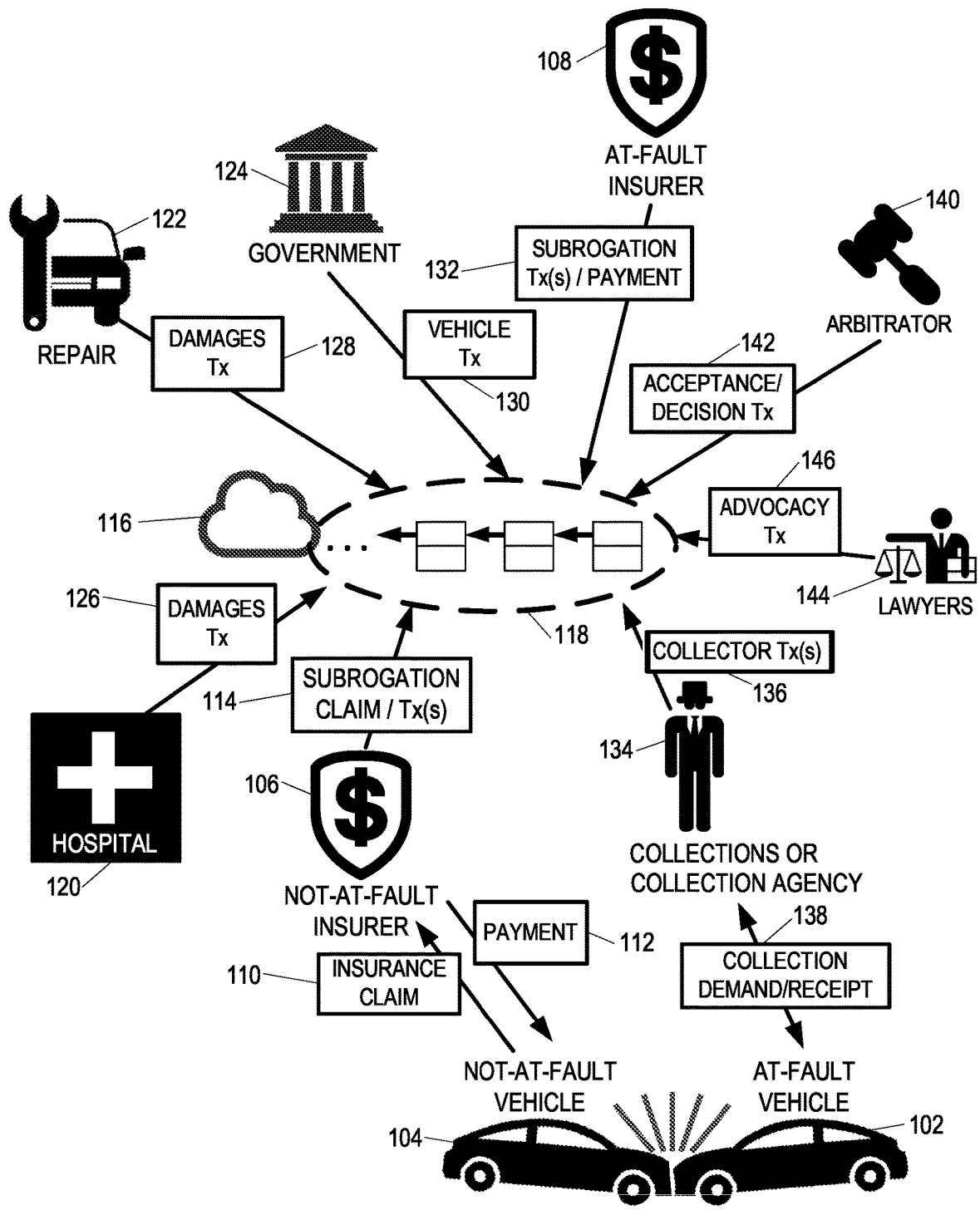
FIG. 1 is a schematic diagram of an exemplary shared ledger system for managing and resolving subrogation claims with arbitration, in accordance with one aspect of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Traditionally, businesses, customers, and central authorities, such as those involved in a subrogation claim, have stored information related to transactions, and records of transactions, in databases or ledgers. Often these databases and ledgers are held by the participants and must be reconciled to achieve consensus as to the validity of the information stored therein. Alternatively, a central authority may be responsible for determining the validity of information stored in a database or a ledger and functioning as an arbiter of consensus for interested parties, such as a recorder of deeds, an asset exchange, etc.

A blockchain (also referred to herein as a distributed ledger or a shared ledger) is a way of achieving a distributed consensus on the validity or invalidity of information in the chain. In other words, the blockchain provides a decentralized trust to participants and observers. As opposed to relying on a central authority, a blockchain is a decentralized database in which a transactional record of changes to the ledger is maintained and validated by each node of a peer-to-peer network. The distributed ledger is comprised of groupings of transactions organized together into a "block," and ordered sequentially (thus the term "blockchain"). Nodes may join and leave the blockchain network over time and may obtain blocks that were propagated while the node was gone from peer nodes. Nodes may maintain addresses of other nodes and exchange addresses of known nodes with one another to facilitate the propagation of new information across the network in a decentralized, peer-to-peer manner.

The nodes that share the ledger form what is referred to herein as the distributed ledger network. The nodes in the distributed ledger network validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may require that blocks and transactions adhere to format requirement and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules are propagated from nodes that have validated the addition to other nodes that the validating node is aware of. If all the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule is disregarded by validating nodes that receive the change and is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable. Third party intermediaries who assist in the resolution of subrogation claims may thus be disintermediated from the process by a decentralized blockchain.

The validation activities of nodes applying consensus rules on a blockchain network may take various forms. In one implementation, the blockchain may be viewed as a shared spreadsheet that tracks data such as the ownership of assets. In another implementation, the validating nodes execute code contained in "smart contracts" and distributed consensus is expressed as the network nodes agreeing on the output of the executed code.

Blockchains may be deployed in a public, decentralized, and permissionless manner meaning that any party may view the shared ledger, submit new information to be added to the ledger, or join the network as a validating node. Other blockchains are private (e.g., permissioned ledgers) that keep chain data private among a group of entities authorized to participate in the blockchain network.

The present embodiments relate to systems and methods for using a blockchain to record and manage information related to resolution of a subrogation claim (e.g., a "subrogation" blockchain). The subrogation blockchain may be either a public or permissioned ledger.

Exemplary Shared Ledger for Resolving Subrogation Claims with Determination of Fault FIG. 1 depicts an exemplary shared ledger system 100 for resolving subrogation claims with determination of fault in accordance with one aspect of the present disclosure. When an insured party, such as the owner of not-at-fault vehicle 104 experiences a covered loss, for example in a collision with at-fault vehicle 102, the owner of not-at-fault vehicle 104 may submit an insurance claim 110 to an insurer 106. The insurer 106 may have a contractual obligation to remit a payment 112 to the owner of the not-at-fault vehicle in exchange for assignment of any legal claim the owner of not-at-fault vehicle may have against the owner or operator of at-fault vehicle 102 for damage and expenses associated with the collision.

After insurer 106 has remitted payment 112 to the owner of the not-at-fault vehicle 104 and receive assignment of the vehicle owner's claim against the owner or operator of at-fault vehicle 102, the insurer 106 may initiate a process of managing and resolving the legal claim against the owner or operator of the at-fault vehicle 102 or against an insurer 108 of the at-fault vehicle (e.g., a subrogation claim). The shared ledger system 100 includes a blockchain 118 accessible by network participants via a network 116 (e.g., a private or public packet switched network). To begin the blockchain subrogation claim resolution process, the insurer 106 broadcasts a subrogation claim or transaction 114 to the blockchain 118.

The blockchain 118 may be a network wherein participating network nodes validate changes to a shared ledger based upon transactions broadcast by other network participants. The transaction 114, and other transactions disclosed herein, may include information relating to the subrogation claim that may be modified by subsequent transactions broadcast over the network 116. In another implementation, validators on the blockchain 118 are configured to maintain a state database and execute code in smart contracts deployed by network participants.

A smart contract on the blockchain 118 may expose methods and maintain the state of data relating to a subrogation claim by the insurer 106 against the insurer 108 relating to an insured loss covered by the insurer 106. Methods of the smart contact may be public methods available to be called by any of the network participants. Alternatively or additionally, methods of a smart contract on the blockchain 118 may include private methods that may only be called by certain parties. A smart contract on the blockchain 118 may have a contract owner who may establish and/or alter the smart contract. A smart contract owner may assign permissions to certain network participants.

After a subrogation claim 114 has been lodged by insurer 106, information relating to the covered loss may be collected by other parties that were involved in the collision to evaluate the subrogation claim. For example, a hospital 120 may broadcast a damages transaction 126 to the blockchain 118 that includes evidence of medical bills incurred as part of the collision. An automotive services repair provider 122 may broadcast a transaction 128 to supply information regarding repair services estimated or rendered as a result of the collision. A government entity 124 may supply evidence relating to the collision in vehicle transaction 130. Vehicle transaction 130 may include information relating to one or more of the vehicles 102 and 104 involved in the collision relevant to the subrogation claim (e.g., registration status, registered owner, legal title information, police reports regarding the collision, driving records of the drivers involved in the collision, lien information regarding the vehicles 102 and 104, etc.).

When entities broadcast transactions to the blockchain 118 to initiate or add data to a subrogation claim, the transactions may be accompanied by a proof-of-identity of the entity broadcasting the transaction. In one implementation, a cryptographic proof-of-identity is included in transactions sent to the blockchain. For example, each of the entities 106, 108, 120, 122, and 124 may own private cryptographic keys that are associated with public cryptographic keys known to belong to the entity (e.g., public cryptographic keys associated with each of the entities may be published by a trusted third party or proven to other network participants, etc.) An entity wishing to broadcast a transaction to the blockchain 118 may sign a cryptographic message in the transaction with the entity's private cryptographic key to prove the identity of the entity broadcasting the transaction. In this way, other network participants may be provided with cryptographic proof that the information contained in the broadcast transaction was originated by the participating entity.

After entities such as the hospital 120, automotive repair services provider 122, government agency 124, etc. have supplied information relevant to the subrogation claim, the subrogation claim defendant insurer 108 may broadcast one or more subrogation transactions 132 to the blockchain 118 to indicate acceptance or rejection of the various components of the subrogation claim. For example, if the subrogation claim defendant 108 disputes that medical care provided by the hospital 120 was caused by the collision, and thus would form a proper basis for liability to the subrogation claimant insurer 106, the subrogation defendant insurer 108 may broadcast a transaction marking the damages transaction 126 as disputed or not agreed. In response, the insurer 106 may broadcast a transaction 114 to respond to the subrogation defendant 108's rejection, such as lowering the damages claimed as part of the medical costs incurred at the hospital 120, adding more evidence of the nature of the medical services rendered by the hospital 120, etc.

If the subrogation defendant insurer 108 accepts the damages associated with the subrogation claim brought by the claimant insurer 106, the subrogation defendant insurer 108 may broadcast a transaction 132 to the blockchain 118 to indicate a resolution of the subrogation claim for the amount reflected by the blockchain 118. Alternatively, or additionally, the subrogation defendant insurer 108 may broadcast a transaction to the blockchain 118 reflecting payment of the subrogation claim and/or may broadcast a transaction sending a token having value that circulates on the blockchain 118 to the insurer claimant 106.

One or more of the parties to the subrogation claim (e.g., the insurers, the parties to the loss, etc.) may demand resolution of the subrogation claim by a third party. One example of a third party who may resolve the subrogation claim on the blockchain 118 is an arbitrator 140. The arbitrator 140 may become involved in resolving the subrogation claim in any of several ways. In one implementation, the subrogation claim or transactions 114 broadcast to the network by the subrogation claimant 106 may include an arbitration demand. In other implementations, the subrogation defendant 108 may issue an arbitration demand in its subrogation transactions 132. The parties to the subrogation claim may first attempt to resolve the dispute without arbitration, and may only demand arbitration if the claim fails to resolve. The parties may instead demand arbitration before attempting to resolve the dispute on the blockchain 118 without arbitration.

An arbitration demand may be accepted by the arbitrator 140 on-chain by broadcasting an acceptance/decision transaction 142. The acceptance/decision transaction 142 may mark the subrogation claim as accepted by the arbitrator 140 and therefore no longer in a pool of available arbitration cases on the chain 118. In some implementations, the subrogation claim on the chain 118 (e.g., a smart contract representing the claim, a set of related transactions in an UTXO model chain, etc.) is also accepted by the parties to the claim as indicated by acceptance transactions (e.g., after the arbitrator 140 has cleared a conflict check or otherwise approved by the parties). An arbitration demand on the chain 118 may include a demand for an arbitrator who holds a qualification issued by a professional organization, who holds a membership in a professional society or organization, is whitelisted by the parties, or who holds a credential for deciding disputes in arbitration. In this manner, arbitrators 140 may perform freelance work. The arbitrators may accept any arbitration demands broadcasted to the network, as opposed to conventional systems where arbitrators may be employed by a particular insurer to hear non-party cases. For example, as a member of an arbitration group, an insurer may be expected to provide an arbitrator to hear a non-party case each time the insurer submits a party case to arbitration and obtains an arbitrator from another insurer which is not a party to the arbitration for the submitted case.

Once an arbitrator 140 has accepted an arbitration demand, the arbitrator 140 may broadcast additional transactions 142 to the blockchain 118 to establish a schedule for the arbitration, to request evidence from the parties, to request damages and/or liability calculations, to request acceptance of damages and/or liability calculations, to request counter-proposals to damages and/or liability, to request settlement proposals and/or acceptance, etc. The parties may broadcast transactions to the blockchain 118 to indicate their proposals, acceptance/rejection, etc. of the requests by the arbitrator. In one implementation, the transactions broadcast by the parties to the subrogation claim and/or the arbitrator include sending data to a smart contract on the blockchain 118. For example, the transactions may include sending a zero amount of a token on the chain to the smart contract to call functions on the smart contract. Functions on the smart contract may allow the parties to flip flags, set data, and perform changes to the state data of the contract that represents the subrogation claim.

In some implementations, arbitration does not successfully resolve a subrogation claim between the parties. As such, one of the parties may withdraw from arbitration by broadcasting a subrogation transaction indicating the withdrawal. In some implementations, any smart contract state from the on-chain arbitration proceedings is preserved for future dispute resolution (e.g., evidence introduced, positions taken, calculations proposed/accepted, etc.) because it resides on the immutable blockchain 118.

In some implementations, parties may indicate lawyers 144 are desired to advance the subrogation claim, such as in a court of law for example. If a party to the subrogation claim desires involvement of lawyers it may be indicated on the blockchain 118 by sending data to a smart contract (e.g., to flip a flag in the smart contract state indicating interest, by adding a transaction to a UTXO model chain that indicates the interest and association with the subrogation claim, etc.). Lawyers 144 may monitor the blockchain 118 for available cases. If a lawyer 144 notices an available subrogation claim, the lawyer 144 may examine data already on-chain to evaluate the merits of the claim and to decide whether the lawyer 144 should take the case.

Another third party that may be involved in the subrogation claim on the blockchain 118 are collections, or collection agencies 134. Upon resolution of a claim, the prevailing party may experience difficulty in collecting any judgment owed. As such, the prevailing party may indicate interest in collection services from collections, or collection agencies 134 in much the same way as the parties indicate desire for arbitration or for lawyers to take the case. A subrogation judgment may be assigned to the collections, or collection agency or collections, or the collection agency may charge a fee for the collection services rendered. The collections, or collection agency 134 may broadcast collection transactions 136 to the blockchain 118 to indicate status of collection on judgments from the at-fault party 102 and/or the at-fault insurer 108.

The parties to the subrogation claim and entities who are not parties to the subrogation claim may transmit evidence of data relating to fault to the blockchain 118 for a determination of fault. For example, vehicle 104 and vehicle 102 may broadcast telematics data to the blockchain 118 from a time period around a crash that gave rise to the subrogation claim. The telematics data may be analyzed by that parties to the subrogation claim to determine whether the data gives rise to an indication of fault. Other types of data may be broadcast to the blockchain regarding fault, such as road sensors, IoT sensors, video cameras, biometric data regarding a driver, weather data, etc.

Figure 2:
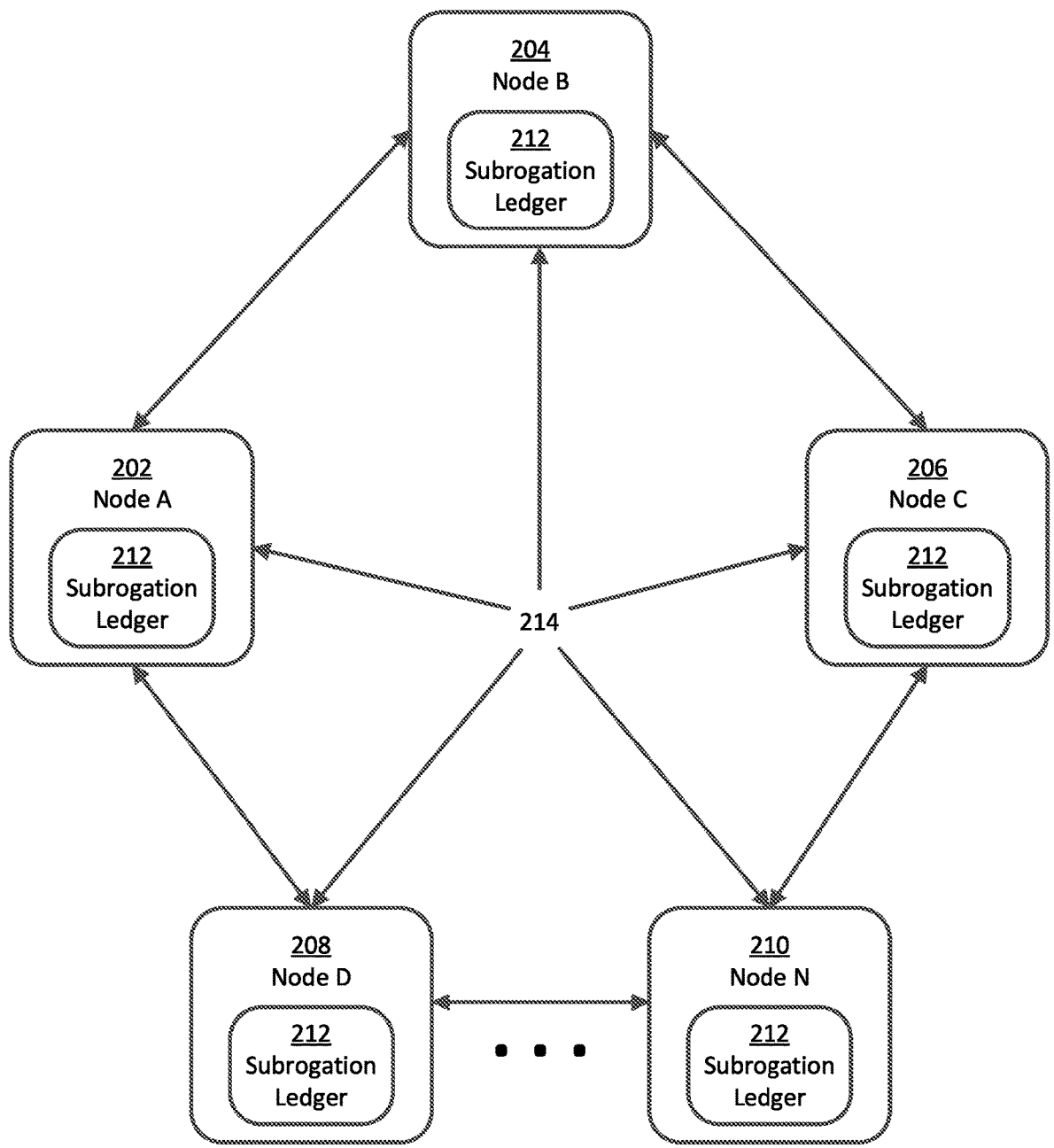
FIG. 2 depicts an exemplary shared ledger system for resolving subrogation claims with fault determination in accordance with one aspect of the present disclosure.

Exemplary Validating Nodes in a Distributed Ledger System for Resolving Subrogation Claims FIG. 2 depicts an exemplary shared ledger system 200 for resolving subrogation claims with fault determination in accordance with one aspect of the present disclosure. The system 200 includes a shared subrogation ledger 212 and plurality of nodes 202, 204, 206, 208, and 210. Each node maintains a copy of the subrogation ledger 212. As changes are made to the subrogation ledger 212, each node received the change via network 214 updates its respective copy of the shared subrogation ledger 212. A consensus mechanism may be used by the nodes 202-210 in the shared ledger system 200 to decide whether it is appropriate to make received changes to the subrogation ledger 212.

Each node in the system therefore has its own copy of the subrogation ledger 212, which is identical to every other copy of the subrogation ledger 212 stored by the other nodes. The shared ledger system 200 is more robust than a central authority database system because of the shared ledger's decentralized nature. As such, there is no single point of failure on the shared ledger system 200 as there would be in a centralized system.

Exemplary Transaction Flow & Block Propagation Flow

Figure 3:
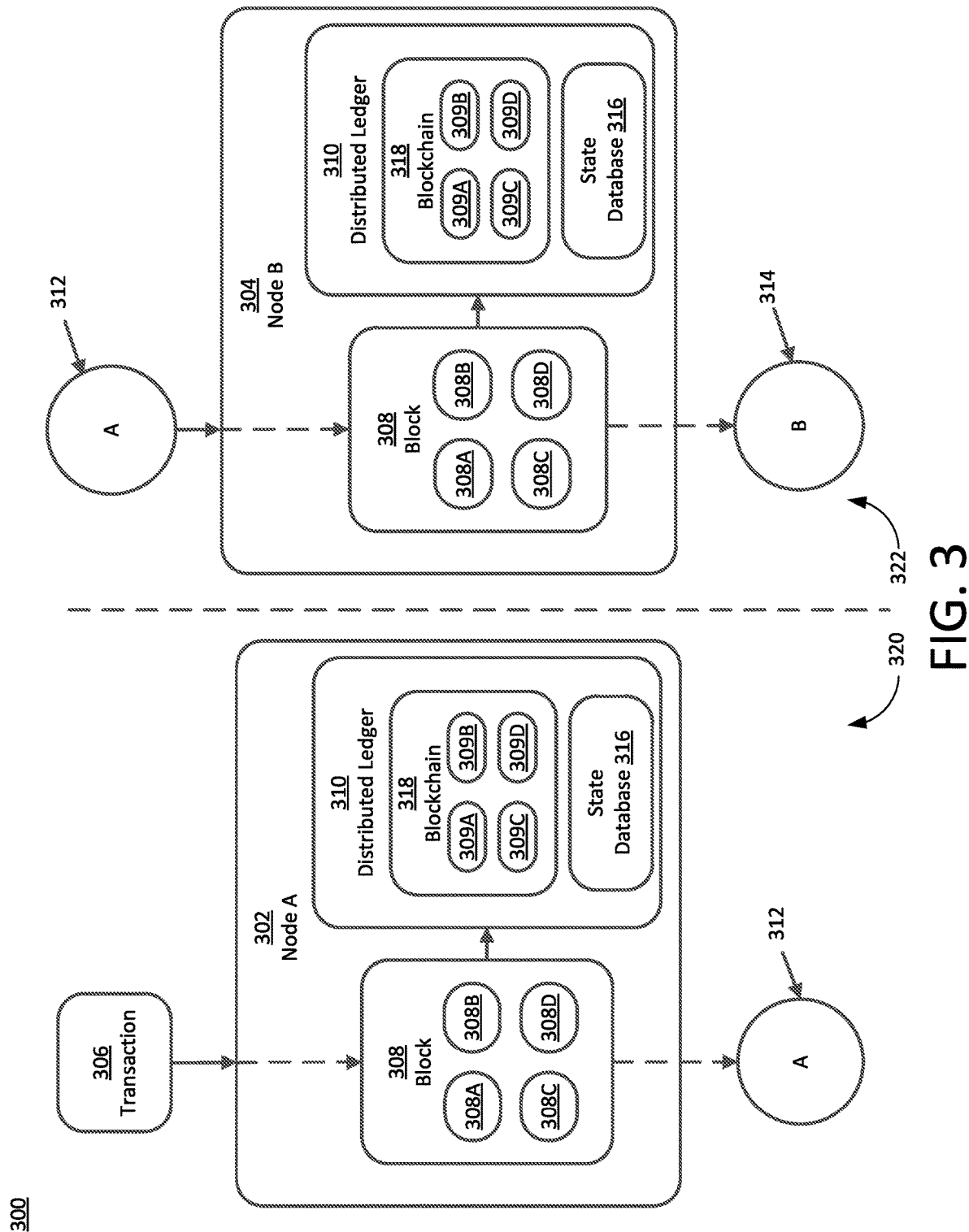
FIG. 3 depicts exemplary validating network nodes and an exemplary transaction flow on a shared ledger network for resolving subrogation claims with fault determination, in accordance with one aspect of the present disclosure.

FIG. 3 depicts exemplary validating network nodes and an exemplary transaction flow 300 on a shared ledger network for resolving subrogation claims with fault determination in accordance with one aspect of the present disclosure. FIG. 3 includes two time frames 320 and 322 represented by the left and right sides of the dotted line, respectively, Node A 302 and Node B 304, a set of transactions 308A-308D, a set of blocks of transactions 309A-309D, a distributed ledger 310, and a blockchain 318.

The block propagation flow 300 may begin with Node A 302 receiving transaction 306 at time 320. When Node A 302 confirms that transaction 306 is valid, the Node A 302 may add the transaction to a newly generated block 308. As part of adding the transaction 306 to block 308, Node A 302 may solve a cryptographic puzzle and include the solution in the newly generated block 308 as proof of the work done to generate the block 308. In other embodiments, the transaction 306 may be added to a pool of transactions until a sufficient number of transactions in the pool exist to form a block. Node A 302 may transmit the newly created block 308 to the network at 312. Before or after propagating the block 308, Node A 302 may add the block 308 to its copy of the blockchain 318.

The transactions 309A-309D may include updates to a state database 316. The state database 316 may contain current values of variables created by smart contracts deployed on the blockchain 318. Validated blocks such as block 308 may include transactions affecting state variables in state database 316. At time 322 Node B 304 may receive the newly created block 308 via the network at 312. Node B 304 may verify that the block of transactions 308 is valid by checking the solution to the cryptographic puzzle provided in the block 308. If the solution is accurate then Node B 304 may add the block 308 to its blockchain 318 and make any updates to the state database 316 as rejected by the transactions in block 308. Node B 304 may then transmit the block 308 to the rest of the network at 314.

Exemplary Node

Figure 4:
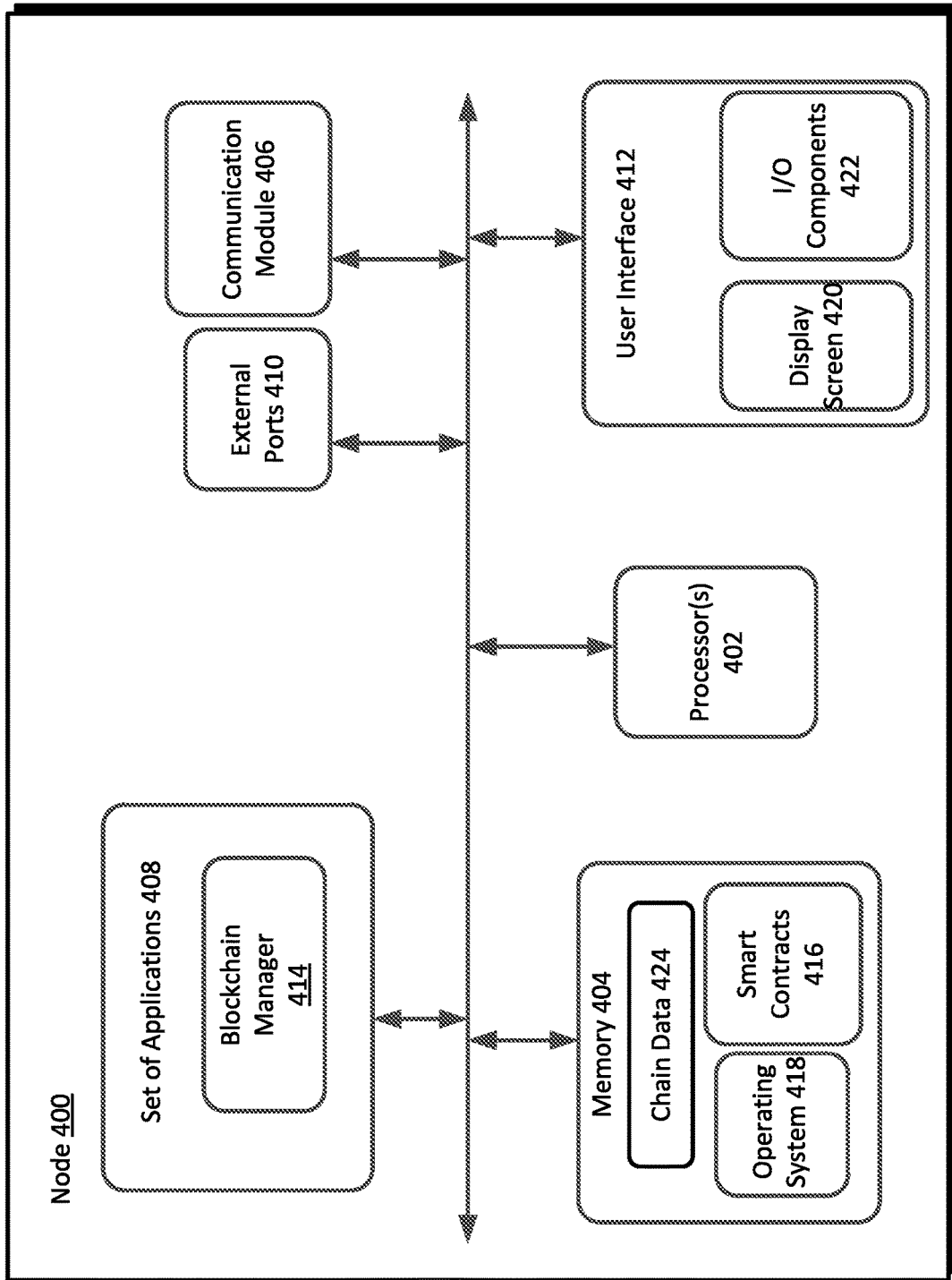
FIG. 4 depicts exemplary components of a network node on a shared ledger network for resolving subrogation claims with fault determination, in accordance with one aspect of the present disclosure.

FIG. 4 depicts exemplary components of a network node 400 on a shared ledger network for resolving subrogation claims with fault determination in accordance with one aspect of the present disclosure. Node 400 is capable of performing the functionality disclosed herein. Node 400 may include at least one processor 402, memory 404, a communication module 406, a set of applications 408, external ports 410, user interface 412, a blockchain manager 414, smart contracts 416, operating system 418, a display screen 420, and input/output components 422. In some embodiments, the node 400 may generate a new block of transactions or may broadcast transactions to other network nodes by using the blockchain manager 414. Similarly, the node 400 may use the blockchain manager 414 in conjunction with the smart contracts 416 stored in memory 404 to execute the functionality disclosed herein. The memory 404 may further include chain data 424 including, for example, a state database of the blockchain for storing state of smart contracts deployed thereon.

In other embodiments, the smart contracts 416 operate independent of the blockchain manager 414 or other applications. In some embodiments, node 400 does not have a blockchain manager 414, or smart contracts 416 stored at the node. In some embodiments, the node 400 may have additional or less components than what is described. The components of the node 400 are described in more detail below.

The node 400, as part of a decentralized ledger system 112, or another decentralized or centralized network, may be used as part of systems that interact with and/or manipulate data and transactions associated with the automotive claims process, the vehicle loss history process, and/or the vehicle identification number lifecycle process.

Exemplary Smart Contract State

FIG. 5 depicts an exemplary smart contract state 500 in a shared ledger network for resolving subrogation claims with fault determination in accordance with one aspect of the present disclosure. A smart contract may be deployed by any participant in the subrogation blockchain network (e.g., a subrogation claimant) to establish a contract state 506 for a particular subrogation claim. The deployed smart contract may expose methods and data to other participants in the subrogation blockchain network. Some of the data in the smart contract state may be private data that may only be altered by calling a method of the smart contract or only altered by authorized blockchain participants.

One way of altering the smart contract state 506 is to broadcast a transaction to the subrogation blockchain 502. If the broadcast transaction satisfies consensus rules, network validators may include the transaction in a block 504. Inclusion in the blockchain 502 of a transaction sending data to the smart contract may cause validating nodes to update a state database, thus allowing network participants access to a rich state mechanism to manage the subrogation process and ultimately to resolve the subrogation claim.

Subrogation smart contract state 506 may include pieces of data to identify and track the subrogation claim. For example, a contract owner may select a unique ID for the subrogation claim such that subsequent transactions and data sent to the smart contract can identify the contract by ID number. The contract owner may also specify an identity of the subrogation claimant and defendant. In at least one implementation, the subrogation claimant and defendant are identified by cryptographic public keys assigned to the respective entities. Subsequent data sent to the smart contract may include a message signed by private keys corresponding to the public keys identifying the subrogation claimant and defendant in the smart contract, thus providing cryptographic proof that the transaction was originated by one of the parties to the dispute. The private and public keys may be managed solely by the parties to minimize the attack surface for any attackers that might attempt to forge a transaction (e.g., the parties generate public/private cryptographic key pairs offline and only provide the public key to other network participants). A party's private keys may be generated according to a securely stored seed value (e.g., on a piece of physical paper or multiple copies of a piece of paper) such that the private keys may be recovered in the case of a data loss.

The smart contract state 506 may further include information regarding the basis of the subrogation claim such as the policy holder and a description of the damages suffered (e.g., date, time, place, etc.). A subrogation blockchain network participant may monitor the blockchain 502 for any subrogation claims that identify the participant as a subrogation defendant. As such, it is not necessary for a subrogation claimant to notify a subrogation defendant "off-chain" of the existence of the claim. A subrogation claimant may additionally make such a notification to the subrogation defendant as a redundant communication.

Resolving a subrogation claim may require assembling evidence of the damages suffered by a policy holder. The evidence could take the form of expert or witness statements (e.g., a statement from a treating doctor that an injury and/or medical care was the result of a collision, statement of a witness to a collision tending to establish the fault of the subrogation defendant's insured vehicle driver, etc.). The evidence could also take the form of documentary evidence (e.g., report from an authorized automotive repair services provider of damage to a vehicle as the result of a collision, a repair estimate, a repair bill for repair services rendered, a certification from a government entity that a vehicle involved in a collision had a valid registration, etc.).

As evidence regarding the subrogation claim is collected from the various entities involved (medical, auto repair, governmental, etc.), these entities may broadcast transactions to the blockchain 502 to reflect the status of the loss and to provide the evidence therefor to other network participants, specifically the subrogation claimant and defendant. For example, a doctor who treated a patient for injuries sustained in a collision may broadcast a transaction sending data to the smart contract to connect the patient's injuries to the collision. The evidence may take the form of a cryptographically signed statement from the doctor attesting to the injuries. The evidence could take the form of a digitized X-ray or other medical record tending to prove the existence of an injury. The evidence could further take the form of medical bills issued by the hospital for services rendered for the injuries. Like the subrogation claimant and defendant, a doctor or hospital may own a private cryptographic key that corresponds to a public cryptographic key known to belong to the hospital or doctor by the other network participants. By signing any submitted evidence with the private cryptographic key, the hospital or doctor may provide cryptographic proof of identity to the subrogation defendant that the evidence was truly submitted by the doctor or hospital. A subrogation defendant may choose to rely solely on the cryptographic proof offered by the doctor/hospital without separately contacting the doctor/hospital to verify the data. In this way, the blockchain 502 reduces time and cost associated with resolving a subrogation claim.

The subrogation defendant may also submit comments in response to the evidence by broadcasting transactions to the blockchain 502. Additionally, the subrogation claimant may submit comments in response to the subrogation defendant's comments by broadcasting transactions to the blockchain 502 and the subrogation defendant and claimant may have a discussion back and forth that is broadcasted to the blockchain 502. The comments that form the discussion back and forth may be stored as part of the smart contract state data for recordkeeping purposes.

Another aspect of the subrogation smart contract state 506 associated with a subrogation claim is the smart contract data. Smart contract data may be thought of like the private and public data in an object created according to an object-oriented programming paradigm in that they may be directly updated from outside the object or they may be updated only in limited ways, such as by calling a method of the smart contract. In at least one implementation, smart contract data includes an indication (e.g., a flag) as to whether the parties to the subrogation claim accept evidence in the smart contract as representative of the damages owed by the subrogation defendant. These flags may be set according to methods in the smart contract that require the caller to prove its identity. The method may only permit, for example, a subrogation defendant to set a flag indicating the subrogation defendant's acceptance of a component of the damages of the subrogation claim. For example, once sufficient evidence relating to the cost of a medical treatment has been included in the smart contract, a subrogation claimant may indicate its approval of the evidence by setting a flag.

A subrogation defendant, upon review of the medical evidence, may choose to either set its corresponding flag to indicate its acceptance of the medical evidence or it may decline to do so if it disputes the veracity of the evidence. As such, the smart contract state tracks the various components of the damages owed and refines points of dispute for the parties to the subrogation claim. When all sources of evidence for the value of the subrogation claim have been approved by the subrogation claimant and defendant, the value of the claim has been determined and agreed upon, and a subrogation defendant may mark the settlement as agreed by sending data to the smart contract. Additionally, the subrogation defendant may mark the settlement as paid. In at least one implementation, the blockchain 502 includes a circulating token having value with which the subrogation defendant may pay the subrogation claimant.

The smart contract data may also include an indication (e.g., a flag) as to whether each of the parties to the subrogation claim have provided an offer or a counter-offer and the corresponding amount of the offer or counter-offer. These flags may be set according to methods in the smart contract that require the caller to prove its identity. The method may only permit, for example, the opposing party to set a flag indicating the opposing party's counter-offer and the amount of the counter-offer. For example, when the subrogation defendant submits an offer only the subrogation claimant may set a flag indicating a counter-offer and the amount of the counter-offer. When the subrogation defendant or claimant accepts the latest offer or counter-offer, the settlement may be marked as agreed for the latest offer or counter-offer amount. The offers and counter-offers that represent the negotiation back and forth may be stored as part of the smart contract state data for recordkeeping purposes.

The smart contract data may also be used to make an arbitration demand. In one implementation, a party may send data to the smart contract to alter a smart contract state including an arbitration flag. The flag may be set to true to indicate a desire for arbitration. In other implementations, other data structures may be used to indicate a desire for arbitration such as a list that may include more information than a simple arbitration demand as depicted in FIG. 5. For example, the list may include requirements of the arbitrator such as qualifications, a whitelist of approved arbitrators, conditions of the arbitration (e.g., evidence rules, time frame, cost, damages caps, etc.).

In some implementation, the block of transactions 504 may organize the transactions it has received into a Merkle Tree to facilitate access to the stored transactions. The transactions may be hashed using a cryptographic hash algorithm, such as the algorithms discussed above, and the hash of each transaction may be stored in the tree. As the tree is constructed the hash of each adjacent node at the same level may be hashed together to create a new node that exists at a higher level in the tree. Therefore, the root of the tree, or the node at the top of the tree, is dependent upon the hash of each transaction stored below in the tree. Each transaction may include a set of data. The set of data may include identifying data for the transaction, and transaction data identifying the nature of the transaction and what the transaction entails (e.g., input and output addresses, a transaction value, a document hash value, a timestamp, a transaction fee value, etc.).

In one implementation, documents stored "on" a blockchain are documents that have been hashed according to a cryptographic hashing algorithm (e.g., SHA-256) and the resulting output hash has been included in a transaction in a block that has been accepted by the network nodes as satisfying the consensus rules of the blockchain. As such, the documents may be later verified or validated by comparing the hash of the documents to the hash stored on the blockchain. For example, if a set of documents results in a SHA-256 hash that was recorded on a blockchain on a certain date, then the blockchain provides cryptographic proof that the documents existed as of that date.

One way of storing a document on a blockchain is to broadcast a transaction including a hash of the document to the network, which will be included in a block if the transaction satisfies all of the consensus rules of the network. In some implementations, the blockchain is a permissioned ledger, meaning only authorized network participants may broadcast transactions. In other implementations, only some authorized network participants may make certain transactions. For example, vehicle telematics data tending to show which vehicle was at fault in a collision may be uploaded by the vehicle to the blockchain 502 contemporaneously with or subsequent to a collision. Only a cryptographic hash of the data may be included in the blockchain 502 such that the data may be verified using the blockchain even if it is obtained by a party off-chain.

Validating network nodes may verify that the signed transaction or signed message was signed by the private cryptographic key corresponding to the published public cryptographic key owned by the authorized vehicle manufacturer. In at least one implementation, a valid proof-of-identity may be applied as a consensus rule by the blockchain network. As such, any transaction attempting to add a new VIN number to the blockchain without a cryptographic proof-of-identity matching an identity authorized to add a new VIN number is rejected by the network as non-compliant with the consensus rule.

Exemplary Subrogation Evidence Transactions

Figure 6:
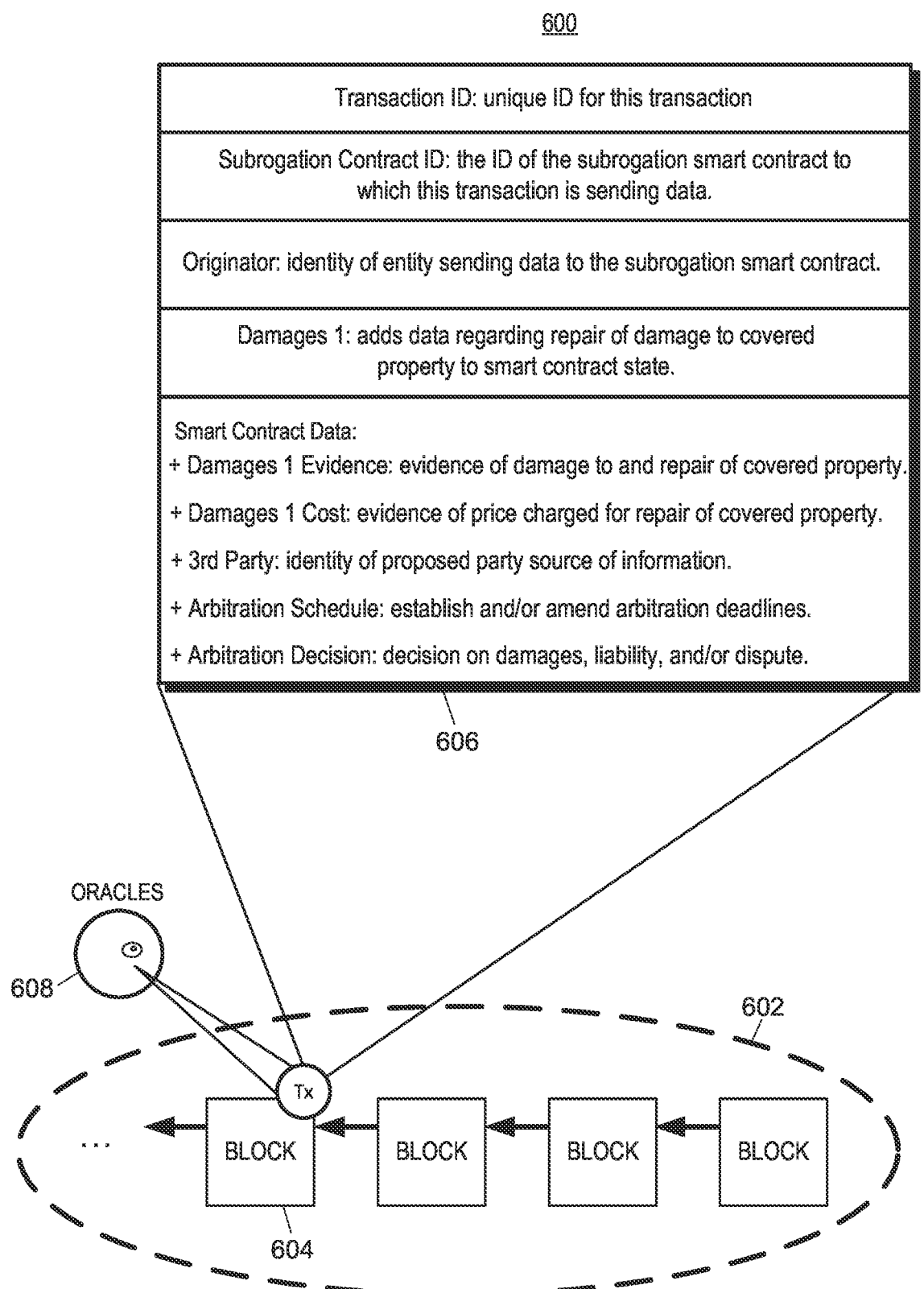
FIG. 6 depicts an exemplary transaction on a shared ledger network for resolving subrogation claims with fault determination, in accordance with one aspect of the present disclosure.

FIG. 6 depicts an exemplary transaction 600 on a shared ledger network for resolving subrogation claims with fault determination in accordance with one aspect of the present disclosure. The transaction 600 may modify a prior transaction or it may send data to a smart contract deployed on the blockchain 602. An originator of the transaction 600 may broadcast the transaction to nodes on the blockchain network and the transaction 600 will be included in block 604 if it is a valid transaction. The transaction 600 may include various information regarding the transaction's changes to the subrogation claim managed by the blockchain 602. For example, the transaction 600 may include the unique subrogation contract ID, the originator of the transaction, a description of the damages, and data including evidence of the damages suffered.

After a collision, a repair facility typically takes control of the vehicle. In some cases the repair facility may provide a rental car, or substitute transportation to the vehicle owner. The repair facility secures authorization to repair the vehicle from the vehicle owner. Once this is secured, the repair facility identifies potential areas of prior damage/betterment, develops a repair plan, and prepares a repair estimate. The repair facility may request parts from suppliers, finalize any parts orders, update the estimate accordingly, and generally manage the repair of the vehicle. As part of the repair process, the repair facility may provide photographic evidence of the damage done to the vehicle. These photographs may then be uploaded to the blockchain after they have been hashed so as to ensure that any private information is protected, but also that the photographs provided are valid.

Evidence of the damage done to the vehicle may also be provided from evidence oracles 608. These evidence oracles may be devices connected to the internet that record information about the physical environment around them. For example, the evidence oracles may be connected video cameras, traffic cameras, road sensors, motion sensors, environmental conditions sensors (e.g., measuring atmospheric pressure, humidity, etc.) as well as other Internet of Things (IoT) devices. Evidence oracles 608 record information occurring in the physical world and may transmit that information to a distributed ledger where it can be used in the subrogation claims process. For example, an evidence oracle may collect data on a traffic intersection. This intersection may be of interest to insurers if it has a history for being a dangerous intersection where accidents frequently occur. The data may be packaged into a transaction, such as transaction 606. The data from the evidence oracle 608 may include a transaction ID, an originator (identified by a cryptographic proof-of-identity, and/or a unique oracle ID), an evidence type, such as video and audio evidence, and a cryptographic hash of the evidence. In another implementation, the evidence is not stored as a cryptographic hash, but is directly accessible in block 604 by an observer or other network participant, such as the participants in a subrogation claim.

Other examples of smart contract data added to the subrogation claim include arbitration schedule and/or arbitration decisions. An arbitration schedule may include deadlines for the parties to submit evidence, brief questions of law, bring or respond to filed motions, participate in conferences with the arbitrator, etc. The arbitration schedule need not be transmitted directly to the parties due to the blockchain's availability to the parties. The arbitrator may require the parties to monitor the subrogation claim state on the blockchain 602 to determine when the deadline exist. Another type of smart contract data is an arbitration decision. The arbitration decision may cover decisions on categories or calculations of damages, admission of evidence, settlement proposals, or the case as a whole.

Figure 7:
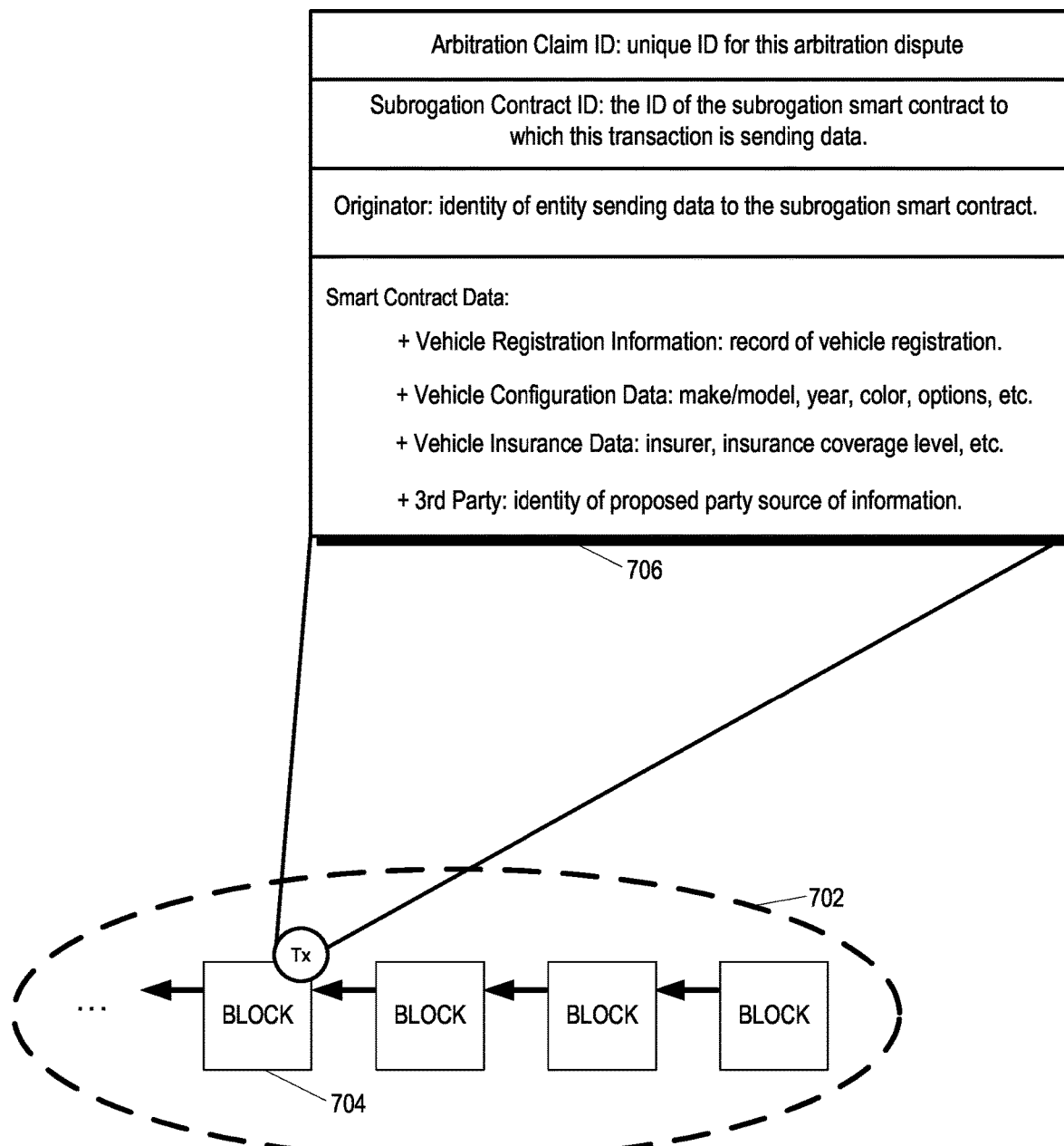
FIG. 7 depicts an exemplary transaction on a shared ledger for resolving subrogation claims with fault determination associated with one aspect of the present disclosure.

FIG. 7 depicts an exemplary transaction 700 on a shared ledger network for resolving subrogation claims with fault determination in accordance with one aspect of the present disclosure. The transaction 700 may modify a prior transaction or it may send data to a smart contract deployed on the blockchain 702. An originator of the transaction 700 may broadcast the transaction to nodes on the blockchain network and the transaction 700 will be included in block 704 if it is a valid transaction. The transaction 700 may include various information regarding the transaction's changes to the subrogation claim managed by the blockchain 702. For example, the transaction 700 may include the unique subrogation contract ID, the originator of the transaction, and information relating to the subrogation claim. In the example illustrated in FIG. 7, the transaction 700 includes data relating to one of the vehicle involved in a collision. As such, the blockchain 702 will include evidence tending to show the value of the vehicle such as its make/model, year, color, options, etc. In one implementation, transaction 700 is broadcast by a government entity and includes data relating to the registration and insurance of the vehicle.

Figure 8:
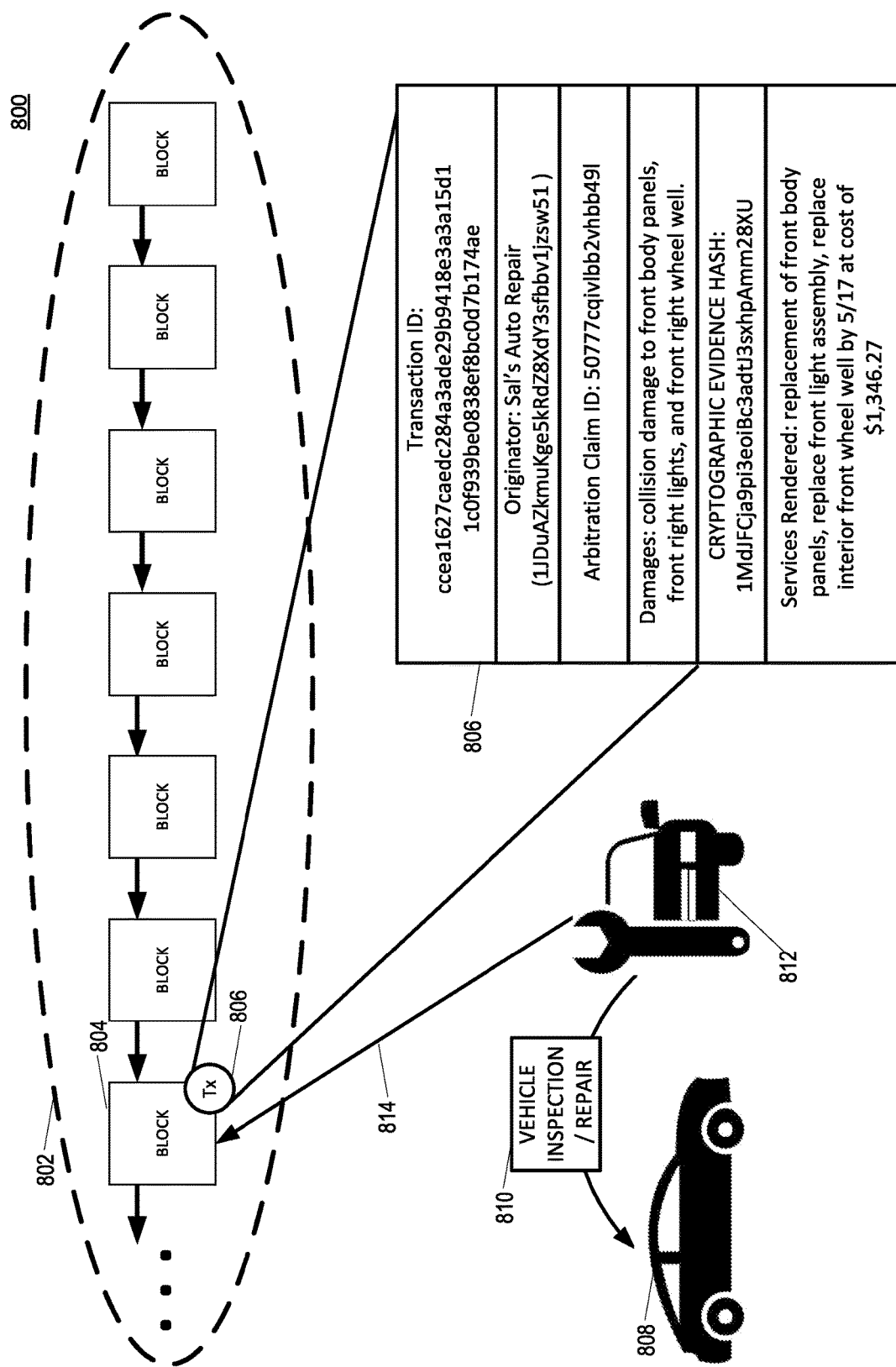
FIG. 8 depicts an exemplary transaction representing vehicle repair damages in a shared ledger network for resolving subrogation claims with fault determination associated with one aspect of the present disclosure.

One type of smart contract data shown in FIG. 8 includes the identity of a third party source of information. In the example illustrated in FIG. 8, new smart contract state data introduced by a new transaction includes information regarding the status of the vehicle, such as an autonomous or semi-autonomous vehicle. An identity of the entity supplying the status of the vehicle may be included in the smart contract (e.g., a governmental body, insurer, registrar, etc.).

Figure 9:
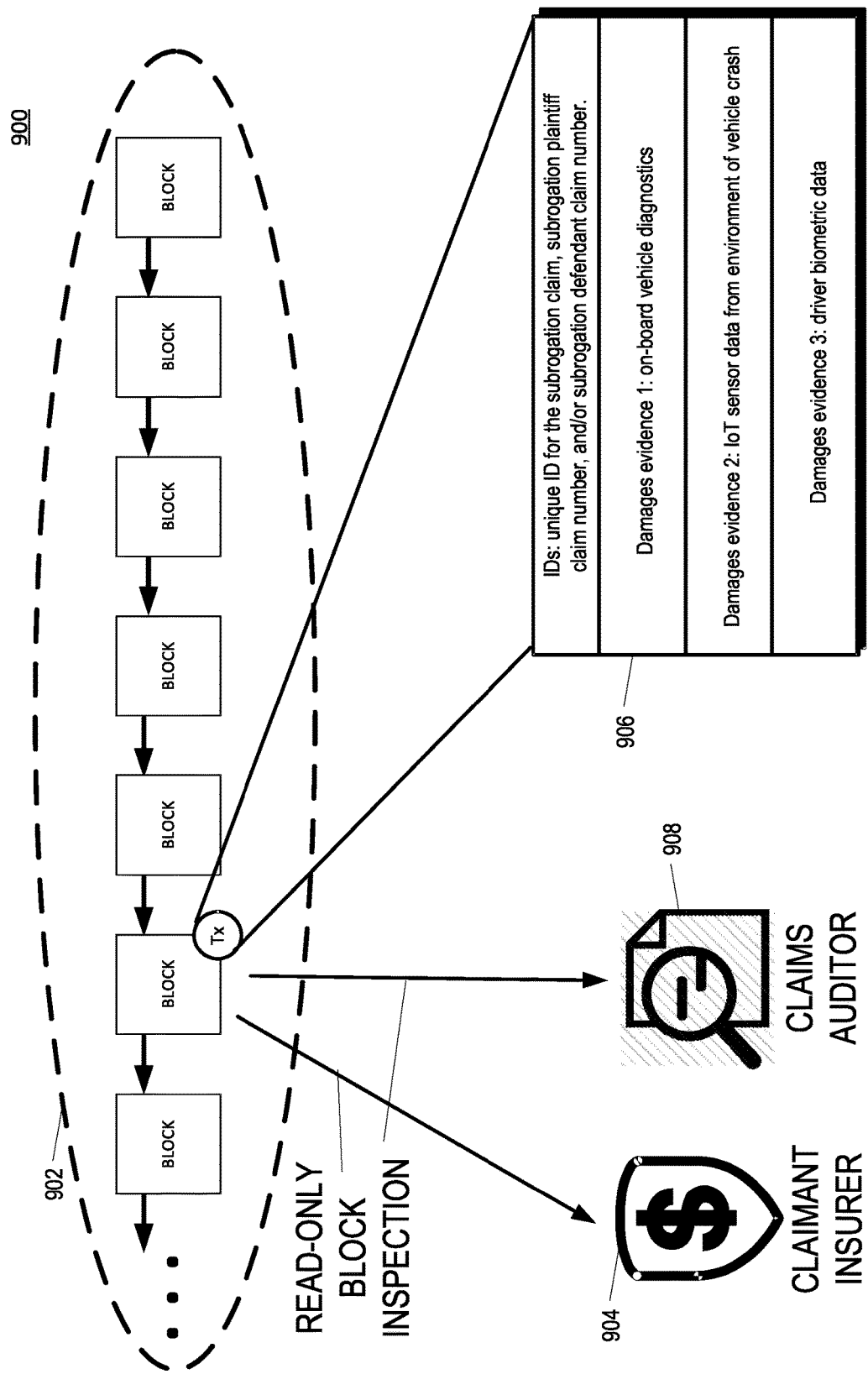
FIG. 9 depicts an exemplary transaction representing a fault determination on a subrogation blockchain.

FIG. 8 depicts an exemplary transaction 800 representing vehicle repair in a shared ledger network for resolving subrogation claims with fault determination associated with one aspect of the present disclosure. After a collision, a vehicle 808, such as an autonomous or conventional vehicle, that was involved in a collision is inspected/repaired 810 by an authorized repair facility 812. The authorized repair facility broadcasts transaction 806 to subrogation blockchain 802 to be included in a block, such as block 804. The transaction 806 includes data to update the state of the subrogation claim such as a transaction ID, an originator (identified by a cryptographic proof-of-identity, a unique subrogation arbitration claim ID, a description of damages, a cryptographic hash of damages evidence, and a description of services rendered and cost). In another implementation, the evidence is not stored as a cryptographic hash, but is directly accessible in block 804 by an observer or other network participant, such as the subrogation claim defendant. The transaction 800 may also include a smart contract data field to allow a subrogation claim defendant to indicate approval or rejection of the damages and evidence therefor.
Exemplary Approval of Fault Determination on a Subrogation Blockchain FIG. 9 depicts an exemplary transaction 900 representing a fault determination on a subrogation blockchain 902. A subrogation claimant insurer 904 inspects a block 906 on the blockchain 902. The block 906 may include a variety of data relating to fault of the subrogation claim disputed on the blockchain 902. In block 906, one category of data relating to fault is on-board vehicle diagnostics. A vehicle may broadcast on-board vehicle diagnostic data to the blockchain 902, directly or indirectly, after a crash that gives rise to the subrogation claim. The on-board vehicle diagnostics may provide evidence of control signals received by a vehicle, position and velocity of a vehicle, and data relating to driver actions and road conditions in a time period leading up to a crash.

Other types of data relating to fault in block 906 include IoT sensor data from an environment of a vehicle crash. IoT sensor data may include road condition data, traffic data, weather data, air quality data, vehicle position and velocity data, and forensic data relating to a vehicle crash giving rise to a subrogation claim. The IoT data may be obtained by a party and broadcast to the blockchain 902, broadcast directly from the IoT devices themselves to the blockchain 902 at the request of a party, broadcast automatically to the blockchain 902 after a crash, etc.

Another type of data relating to fault in block 906 include biometric data. Biometric data may be collected by sensors inside a vehicle regarding any of the occupants of the vehicle (heart rate, breathing rate, etc.) or it may be collected after a crash (e.g., police-administered sobriety test). A camera or other sensor inside a vehicle may record footage of a driver's posture, driving decisions, and/or other information regarding the interior of the vehicle (e.g., children in back seat, whether seatbelts were fastened, other distractions to the driver inside the vehicle, etc.).

In some implementations, a claims auditor 906 determines fault based upon the data regarding fault on the blockchain 902. The claims auditor 906 may analyze the data relating to fault at the request of one of the parties to the subrogation claim, an arbitrator, etc. The claims auditor 908 includes without limitation a forensics analysis of vehicle control decisions and actions prior to a crash, analysis of driver actions, analysis of vehicles not involved in a crash and/or the subrogation claim on the blockchain 902, etc.

Figure 10:
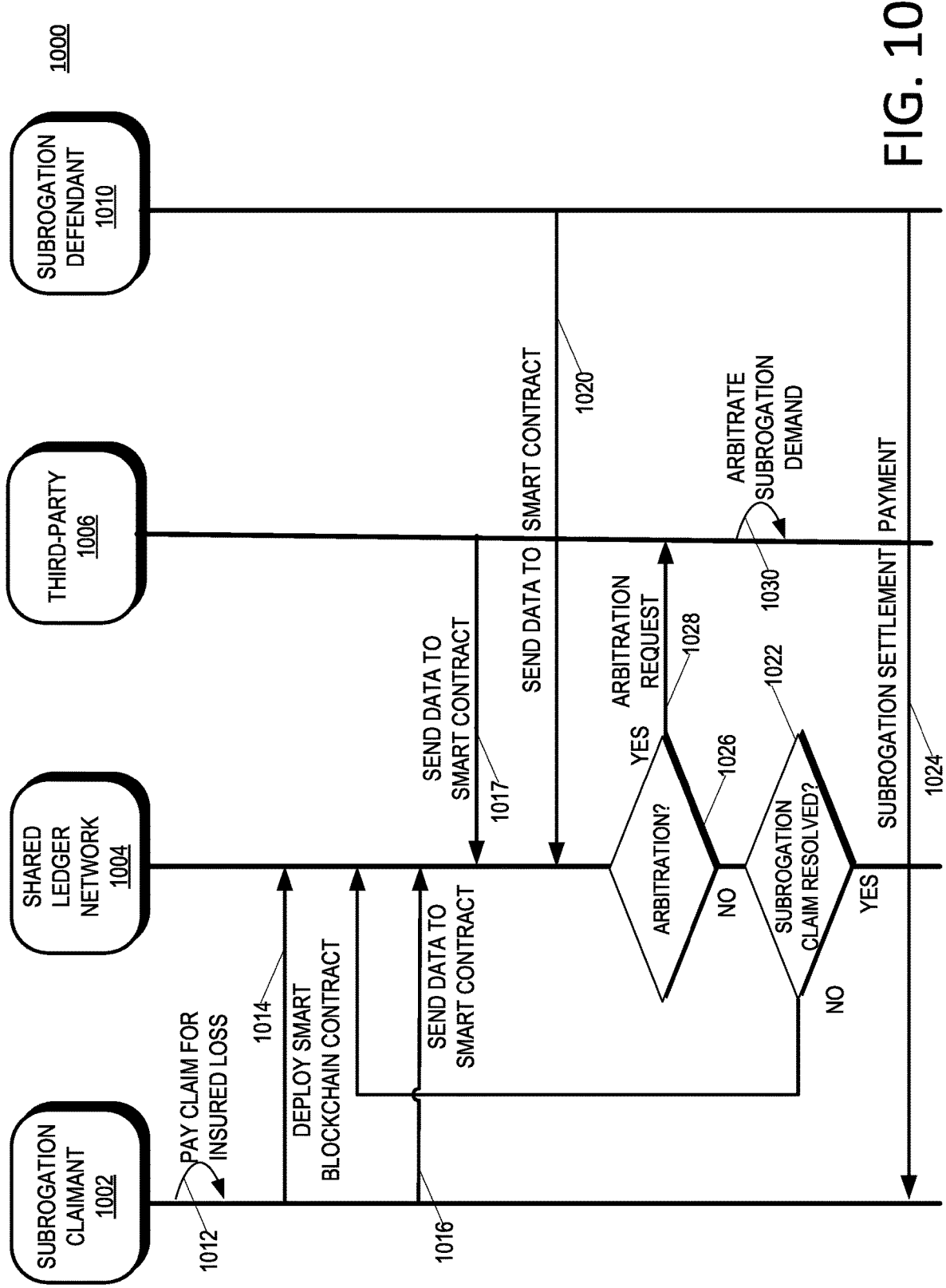
FIG. 10 is a signal diagram of an exemplary process flow for resolving a subrogation claim with fault determination in a shared ledger network associated with one aspect of the present disclosure.

FIG. 10 is a signal diagram 1000 of an exemplary process flow for resolving a subrogation claim in a shared ledger network associated with one aspect of the present disclosure. When a subrogation claimant pays 1002 an insured loss (1012) on a loss for which the subrogation claimant's insured was not at fault, the subrogation claimant 1002 deploys a smart contract 1014 to a shared ledger network 1004 for resolving subrogation claims. Operation 1014 may include depositing a bond with the smart contact in a token having value such that the rules of the smart contract determine when and to whom the bond will be released depending on the outcome of the subrogation claim (or lack of resolution of the subrogation claim). The subrogation sends data to the smart contract (1016) either as part of operation 1014 or separately to populate the smart contract with information pertaining to the subrogation claim.

Third parties 1006 send data to the smart contract (1017) to supply evidence of the claimed loss. The information may include estimates of repair to covered property that was at-loss or for repairs that had already occurred and costs that had already been incurred (e.g., auto repairs, temporary transportation expense, etc.). The transaction 1017 may include a cryptographic proof of identity of the third party 1006 such that only trusted entities may supply data to the shared ledger network 1004. Operation 1017 repeats with different third parties 1006 until no more third parties 1006 add data to the shared ledger 1004.

Data sent to the smart contract (1017) may include data relating to fault in the subrogation claim. The data relating to fault may be sent at the request of one of the parties to the subrogation claim or by the parties themselves.

Third parties may also include autonomous sources or autonomous vehicles. Devices that have networking connectivity may detect the occurrence of a loss and may report loss data to other third parties 1006 or directly to the blockchain. In one implementation, a vehicle (such as a smart or autonomous vehicle) includes sensor data that can detect when a collision has occurred (e.g., airbag deployed, crash codes reported by on-board electronics, etc.). The vehicle may autonomously transmit the data to the blockchain or to other third parties who may, in turn, send the data to the blockchain. The vehicle data may be sent automatically upon detection of a collision and it may be signed with a cryptographic key on the vehicle that cryptographically proves the data originated with the vehicle that was involved in the collision. Due to the immutable nature of a blockchain, autonomous uploading of vehicle crash sensor data also cryptographically proves the time at which the data existed. For example, if vehicle crash sensor data becomes part of a shared ledger as of a certain time and date, it proves the information existed as of that time and date. If crash sensor data becomes part of the shared ledger with, for example, 10 minutes of a collision, then the blockchain proves the data existed as of 10 minutes after the collision. The parties to the subrogation claim may rely on the blockchain to provide evidence that the crash data was not manipulated or modified the closer in time the data was to the actual event which it describes.

A subrogation defendant 1010 sends data to the smart contract (1120) to indicate acceptance or rejection of the components of the subrogation claim and/or the entire claim. At block 1026, an arbitration request is made to a third party if one of the parties has demanded arbitration. The arbitration demand may be made on-chain by altering the state data of a smart contract associated with the subrogation claim. The subrogation claim is arbitrated at 1030 and, if the subrogation claim is settled (1122), the subrogation defendant makes a subrogation settlement payment (1124). If the subrogation claim is not successfully arbitrated at 1030, the work flow returns ("NO") at block 1022 to sending data to the smart contract.

Exemplary Shared Ledger Operations

Figure 11:
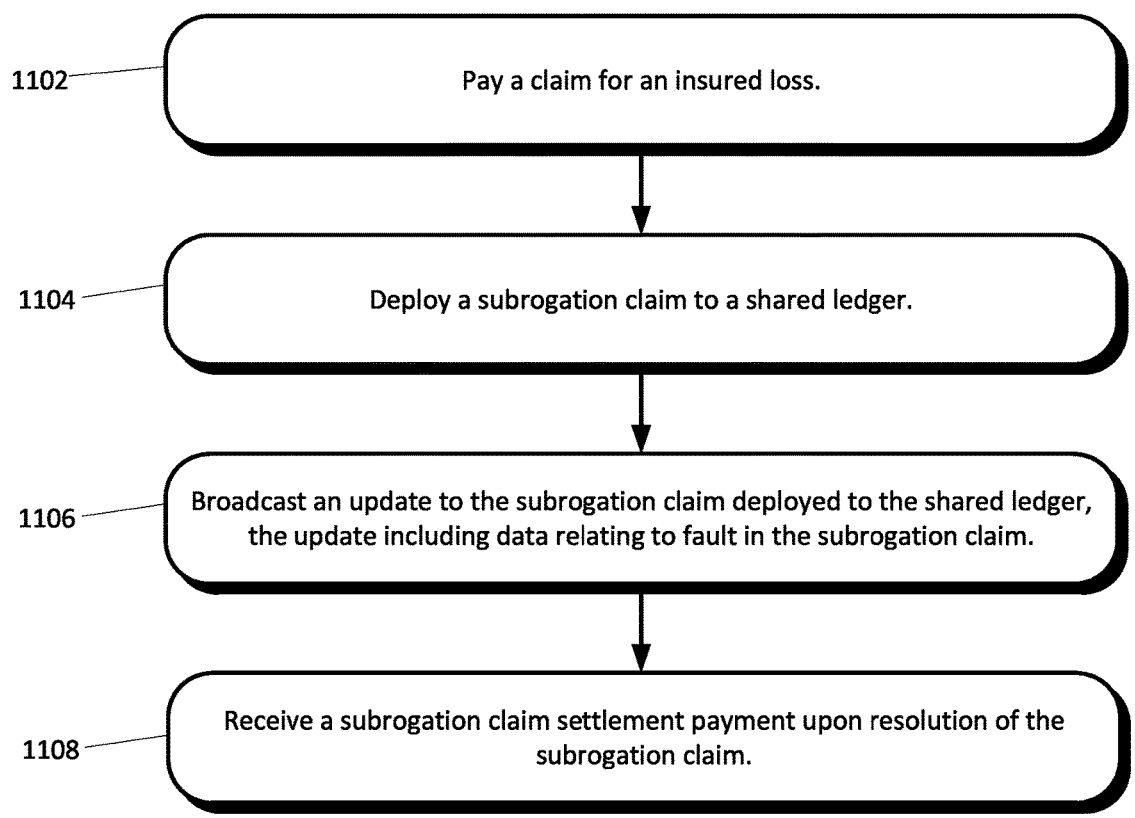
FIG. 11 depicts an exemplary flow diagram for resolving a subrogation claim with fault determination in a shared ledger network associated with one aspect of the present disclosure.

FIG. 11 depicts exemplary operations 1100 for resolving a subrogation claim in a shared ledger network associated with one aspect of the present disclosure. A payment operation 1102 pays a claim for an insured loss. If the entity that performs the payment operation 1102 believes it is entitled to a subrogation payment from another insurer because the other insurer's customer was at-fault in the event that caused the insured loss, then the entity that performs the payment operation 1102 deploys a subrogation claim. The deploying operation 1104 may include broadcasting a transaction to a shared ledger network identifying the subrogation defendant or the deploying operation 1104 may include deploying a smart contract to a shared ledger to manage and resolve the subrogation claim.

A broadcasting operation 1106 broadcasts an update to the subrogation claim deployed to the shared ledger. The broadcasting operation 1106 may initiate components of the subrogation claim such as damages incurred in various areas and includes data relating to fault. The broadcasting operation 1106 may be part of the deploying operation 1104 or the broadcasting operation may be a separate operation. A receiving operation 1108 receives a subrogation claim settlement payment upon resolution of the subrogation claim. The subrogation claim settlement payment may be disbursed according to the rules of a smart contract deployed on the blockchain.

Figure 12:
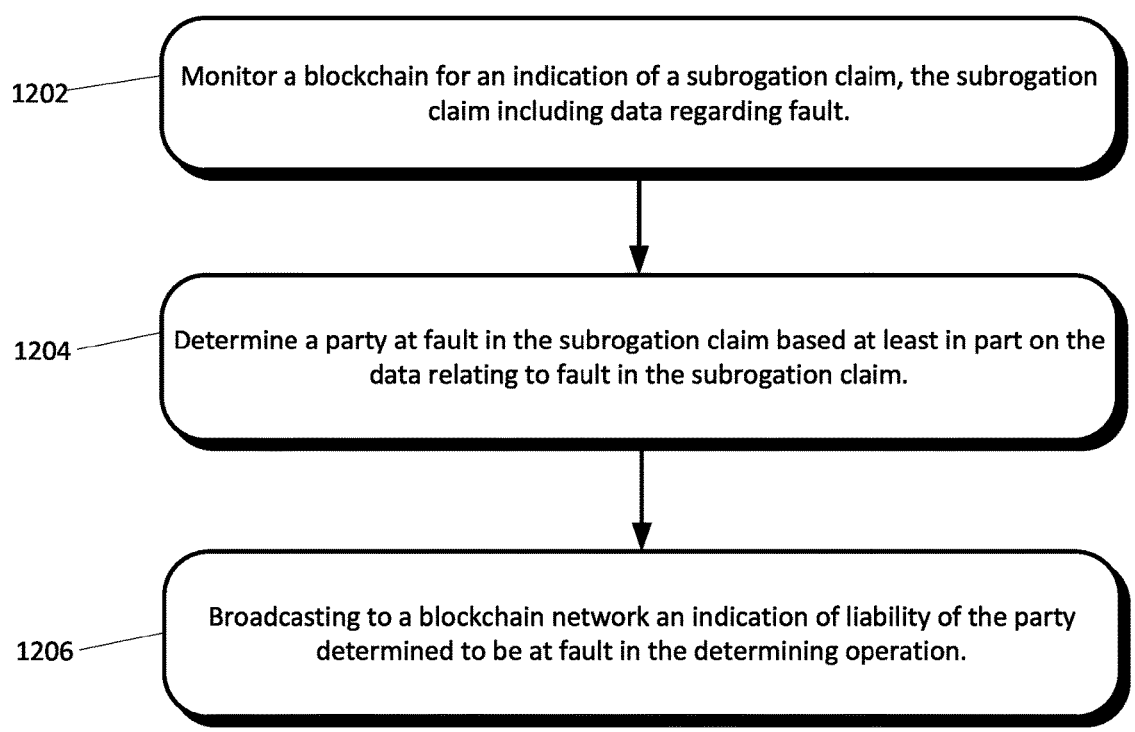
FIG. 12 depicts an exemplary flow diagram for resolving a subrogation claim with fault determination in a shared ledger network associated with one aspect of the present disclosure.

FIG. 12 depicts exemplary operations 1200 for resolving a subrogation claim in a shared ledger network associated with one aspect of the present disclosure. A monitoring operation 1202 monitors a blockchain for an indication of a subrogation claim including data regarding fault. The monitoring operation may be performed by a potential subrogation claim defendant or it may be performed by an independent entity on behalf of a subrogation claim defendant. In one implementation, insurers are subject to a common blockchain agreement that obligates the insurers to periodically check the blockchain for any pending claims against the insurer, such as subrogation claims.

A determining operation 1204 determines a party at fault in the subrogation claim based at least in part on the data relating to fault in the subrogation claim on the blockchain. A broadcasting operation 1206 broadcasts to a blockchain network an indication of acceptance of the evidence regarding the insured loss if the evidence satisfies the acceptance condition. In one implementation, the broadcasting operation 1306 broadcasts a transaction that modified a portion of the ledger representing the subrogation claim. A cryptographically signed message may be included in the transaction signifying the acceptance. In another implementation, the broadcasting operation 1306 sends data to a smart contract deployed on the blockchain, the data sent to the smart contract indicating the acceptance of the evidence. A remitting operation 1210 remits a payment to the subrogation claimant in settlement of the subrogation claim. The remitting operation 1210 may be made off-chain or it may involve transmitting a token having value on the blockchain. In at least one implementation, a smart contract is programmed to disburse the subrogation settlement claim to the subrogation claimant upon the satisfaction of certain conditions (e.g., the acceptance of the subrogation defendant).

Exemplary Computer-Implemented Methods for Settling a Subrogation Claim by a Shared Ledger with Data Relating to Fault In one aspect, a computer-implemented method of settling a subrogation claim by a shared ledger may be provided. The method may include, via one or more processors, servers, and/or associated transceivers: (1) paying a claim to an insured for an insured loss; (2) generating and/or deploying an electronic or virtual subrogation claim to a shared ledger including data relating to fault (such as by transmitting the subrogation claim via wireless communication or data transmission over one or more radio frequency links or communication channels), the subrogation claim identifying a subrogation defendant and including information regarding the insured loss; (3) broadcasting an update to the subrogation claim deployed to the shared ledger (such as via wireless communication or data transmission over one or more radio frequency links or communication channels); and/or (4) receiving (such as via wireless communication or data transmission over one or more radio frequency links or communication channels) a subrogation claim settlement payment upon resolution of the subrogation claim to facilitate resolving subrogation claims. The method may include additional, less, or alternate actions, including those discussed elsewhere herein.

In another aspect, a computer-implemented method of settling a subrogation claim by a shared ledger may be provided. The method may include, via one or more processors, servers, and/or associated transceivers: (1) paying a claim to an insured for an insured loss; (2) generating a subrogation claim, the subrogation claim including data relating to fault and identifying a subrogation defendant and including information regarding the insured loss; (3) transmitting or otherwise deploying the subrogation claim to a shared ledger, (4) broadcasting an update to the subrogation claim deployed to the shared ledger, and/or (5) receiving a subrogation claim settlement payment upon resolution of the subrogation claim. The method may include additional, less, or alternate actions, including those discussed elsewhere herein.

In another aspect, a computer-implemented method of settling a subrogation claim by a shared ledger may be provided. The method may include, via one or more processors, servers, and/or transceivers: (1) monitoring a blockchain for an indication of a subrogation claim with data relating to fault, the subrogation claim identifying a subrogation claimant and including evidence regarding an insured loss; (2) determining whether the evidence regarding the insured loss satisfies an acceptance condition; (3) broadcasting to a blockchain network an indication of acceptance of the evidence regarding the insured loss if the evidence regarding the insured loss satisfies the acceptance condition; and/or (4) remitting a payment to the subrogation claimant in settlement of the subrogation claim. The method may include additional, less, or alternate actions, including those discussed elsewhere herein.

In another aspect, a computer-implemented method of settling a subrogation claim by a shared ledger may be provided. The method may include, via one or more processors, servers, and/or associated transceivers: (1) monitoring a blockchain for an indication of a subrogation claim, the subrogation claim including data relating to fault and identifying a subrogation claimant and including evidence regarding an insured loss; (2) determining whether the evidence regarding the insured loss satisfies an acceptance condition; (3) generating an indication of acceptance of the evidence regarding the insured loss if the evidence regarding the insured loss satisfies the acceptance condition; (4) broadcasting (such as via wireless communication or data transmission over one or more radio frequency links or communication channels) to a blockchain network the indication of acceptance of the evidence; and/or (5) remitting a payment to the subrogation claimant in settlement of the subrogation claim. The method may include additional, less, or alternate actions, including those discussed elsewhere herein.

Exemplary Validating Network Node on a Shared Ledger

In one aspect, a validating network node on a shared ledger network may be provided. The node may include (1) a transceiver configured to exchange shared ledger data with peer network nodes, the shared ledger data including subrogation claim transactions including data relating to fault; (2) a storage media configured to store a copy of the shared ledger, and/or (3) a transaction validator configured to apply a set of consensus rules to shared ledger data received from the peer network nodes, the transaction validator being further configured to append shared ledger data received from peer nodes to the copy of the shared ledger if the shared ledger data satisfies the consensus rules. The node may include additional, less, or alternate functionality, including that discussed elsewhere herein.

ADDITIONAL CONSIDERATIONS

This detailed description is to be construed as exemplary only and does not describe every possible embodiment, as describing every possible embodiment would be impractical, if not impossible. One may be implement numerous alternate embodiments, using either current technology or technology developed after the filing date of this application.

With the foregoing, a user may be an insurance customer who may opt-in to a rewards, insurance discount, or other type of program. After the insurance customer provides their affirmative consent, an insurance provider remote server may collect data from the customer's mobile device, smart home controller, smart or autonomous vehicle, or other smart devices—such as with the customer's permission or affirmative consent. The data collected may be related to smart home functionality (or home occupant preferences or preference profiles), smart or autonomous vehicle functionality, and/or insured assets before (and/or after) an insurance-related event, including those events discussed elsewhere herein. In return, risk adverse insureds, such as home or vehicle owners, or home, vehicle, or apartment occupants may receive discounts or insurance cost savings related to home, renters, personal articles, auto, mobile, and other types of insurance from the insurance provider.

In one aspect, smart or interconnected home data, autonomous or smart vehicle data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk adverse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants, or vehicle passengers.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a business or home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

The invention claimed is:

1. A computer-implemented method of settling a subrogation claim by a shared ledger, the method comprising, via one or more processors, servers, and/or associated transceivers:
   generating a subrogation claim;
   deploying the subrogation claim to the shared ledger maintained by a plurality of participants in a shared ledger network according to a set of consensus rules, the subrogation claim identifying a subrogation defendant; and
   broadcasting an update to the subrogation claim deployed to the shared ledger, the update including data relating to fault in the subrogation claim, the data including sensor data autonomously transmitted from a vehicle in a crash in response to the vehicle detecting the crash, wherein the update further includes a proof-of-identity to cryptographically prove that the sensor data is originated by the vehicle involved in the crash, and wherein the update is appended to the shared ledger in response to the plurality of participants in the shared ledger network determining that the update satisfies the set of consensus rules; and
   receiving a subrogation claim settlement payment upon resolution of the subrogation claim, wherein the subrogation claim is closed upon receipt of the subrogation claim settlement payment.

2. The computer-implemented method of claim 1, wherein the data relating to fault in the subrogation claim further includes biometric data collected from a driver of the vehicle.

3. The computer-implemented method of claim 1, wherein the data relating to fault in the subrogation claim further includes data from vehicles not involved in the crash.

4. The computer-implemented method of claim 1, wherein the data relating to fault in the subrogation claim further includes data from one or more devices having a sensor, the devices not being located on a vehicle.

5. The computer-implemented method of claim 1, further comprising:
   receiving data relating to fault in the subrogation claim by inspecting contents of a block in the shared ledger;
   determining whether the data relating to fault in the subrogation claim weighs in favor of fault of a party to the subrogation claim; and
   broadcasting another update to the shared ledger, the another update including results of the determining operation.

6. The computer-implemented method of claim 5, wherein the determining operation includes determining whether a vehicle violated one or more road laws.

7. The computer-implemented method of claim 5, wherein the determining operation includes determining whether a driver of a vehicle was under the influence of an intoxicant.

8. The computer-implemented method of claim 5, wherein the determining operation includes determining whether a driver of a vehicle did not focus attention on road conditions.

9. The computer-implemented method of claim 1, wherein the subrogation claim is an electronic subrogation claim.

10. A computer system of settling a subrogation claim by a shared ledger, the computer system comprising:
    a network interface;
    one or more processors; and
    a non-transitory computer-readable memory storing instructions thereon, that when executed by the one or more processors, cause the one or more processors to:
       generate a subrogation claim;
       deploy the subrogation claim to the shared ledger maintained by a plurality of participants in a shared ledger network according to a set of consensus rules, the subrogation claim identifying a subrogation defendant; and
       broadcast an update to the subrogation claim deployed to the shared ledger, the update including data relating to fault in the subrogation claim, the data including sensor data autonomously transmitted from a vehicle in a crash in response to the vehicle detecting the crash, wherein the sensor data further includes a proof-of-identity to cryptographically prove that the sensor data is originated by the vehicle involved in the crash, and wherein the update is appended to the shared ledger in response to the plurality of participants in the shared ledger network determining that the update satisfies the set of consensus rules; and
       receive a subrogation claim settlement payment upon resolution of the subrogation claim, wherein the subrogation claim is closed upon receipt of the subrogation claim settlement payment.

11. The computer system of claim 10, wherein the data relating to fault in the subrogation claim further includes biometric data collected from a driver of the vehicle.

12. The computer system of claim 10, wherein the data relating to fault in the subrogation claim further includes data from vehicles not involved in the crash.

13. The computer system of claim 10, wherein the data relating to fault in the subrogation claim includes data from one or more devices having a sensor, the devices not being located on a vehicle.

14. The computer system of claim 10, wherein the instructions further cause the one or more processors to:
    receive data relating to fault in the subrogation claim by inspecting contents of a block in the shared ledger;
    determine whether the data relating to fault in the subrogation claim weighs in favor of fault of a party to the subrogation claim; and
    broadcast another update to the shared ledger, the another update including results of the determining operation.

15. The computer system of claim 14, wherein to determine whether the data relating to fault in the subrogation claim weighs in favor of fault of a party to the subrogation claim, the instructions cause the one or more processors to determine whether a vehicle violated one or more road laws.

16. The computer system of claim 14, wherein to determine whether the data relating to fault in the subrogation claim weighs in favor of fault of a party to the subrogation claim, the instructions cause the one or more processors to determine whether a driver of a vehicle was under the influence of an intoxicant.

17. The computer system of claim 14, wherein to determine whether the data relating to fault in the subrogation claim weighs in favor of fault of a party to the subrogation claim, the instructions cause the one or more processors to determine whether a driver of a vehicle did not focus attention on road conditions.

18. A computer-implemented method of settling a subrogation claim by a shared ledger, the method comprising, via one or more processors, servers, and/or associated transceivers:
    monitoring a blockchain maintained by a plurality of participants in a blockchain network according to a set of consensus rules for an indication of a subrogation claim, the subrogation claim a) identifying a subrogation claimant, b) including evidence regarding an insured loss and a proof-of-identity to cryptographically prove that the evidence of the insured loss is originated by a participating entity, and c) including data relating to fault in the subrogation claim, the data including sensor data autonomously transmitted from a vehicle in a crash in response to the vehicle detecting the crash;
    determining a party at fault in the subrogation claim based at least in part on the data relating to fault in the subrogation claim;
    broadcasting to the blockchain network an indication of liability of the party determined to be at fault in the determining operation; and
    remitting a payment to the subrogation claimant in settlement of the subrogation claim, wherein the subrogation claim is closed after the payment is remitted.

19. The method of claim 18, wherein the determining operation includes determining a fractional amount of damages liability.

20. The method of claim 18, wherein the data relating to fault in the subrogation claim includes at least one of:
    data broadcast to the blockchain by a party to the subrogation claim;
    data broadcast to the blockchain by an entity not a party to the subrogation claim; and/or
    a request for analysis by the entity not a party to the subrogation claim.

* * * * *